(12) United States Patent
Ueno et al.

(10) Patent No.: US 9,390,488 B2
(45) Date of Patent: Jul. 12, 2016

(54) GUIDING METHOD AND INFORMATION PROCESSING APPARATUS

(71) Applicant: FUJITSU LIMITED, Kawasaki-shi, Kanagawa (JP)

(72) Inventors: Ayumi Ueno, Yokohama (JP); Ryouta Komatsu, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/518,850

(22) Filed: Oct. 20, 2014

(65) Prior Publication Data

US 2015/0117752 A1    Apr. 30, 2015

(30) Foreign Application Priority Data

Oct. 24, 2013    (JP) .................................. 2013-221644

(51) Int. Cl.
| | | |
|---|---|---|
| G06K 9/00 | (2006.01) | |
| G06T 7/00 | (2006.01) | |
| G06T 11/00 | (2006.01) | |
| G06K 9/62 | (2006.01) | |

(52) U.S. Cl.
CPC ............ *G06T 7/0004* (2013.01); *G06K 9/6202* (2013.01); *G06T 7/0044* (2013.01); *G06T 11/00* (2013.01); *G06T 2207/10004* (2013.01); *G06T 2207/30108* (2013.01); *G06T 2207/30204* (2013.01); *G06T 2207/30244* (2013.01)

(58) Field of Classification Search
CPC ................. G06T 7/0004; G06T 11/00; G06T 2207/30108; G06T 2207/30204; G06T 2207/10004; G06T 2207/30244; G06K 9/6202

USPC .................... 382/141, 108; 707/769, E17.03; 348/143, 247, 207.99, 222.1, 241, 246; 701/409, 461; 250/200, 206, 208.1

See application file for complete search history.

(56) References Cited

U.S. PATENT DOCUMENTS

| | | | | |
|---|---|---|---|---|
| 5,860,912 | A | * | 1/1999 | Chiba ........................... 600/111 |
| 6,501,501 | B1 | | 12/2002 | Miyazawa |
| 2004/0046779 | A1 | | 3/2004 | Asano et al. |
| 2009/0046896 | A1 | * | 2/2009 | Yamaguchi et al. .......... 382/106 |

(Continued)

FOREIGN PATENT DOCUMENTS

| | | |
|---|---|---|
| JP | 2001-014316 | 1/2001 |
| JP | 2004-048674 | 2/2004 |

OTHER PUBLICATIONS

Australian Office Action issued Nov. 20, 2015 in Patent Application No. 2014250736.

(Continued)

*Primary Examiner* — Sheela C Chawan
(74) *Attorney, Agent, or Firm* — Oblon, McClelland, Maier & Neustadt, L.L.P.

(57) ABSTRACT

A guiding method includes obtaining data of a first image, detecting with a computer reference image data corresponding to a reference object in the data of the first image, calculating with the computer a first condition based on an appearance of the reference object in the first image, the first condition indicating an operational condition of an imaging apparatus when first image was captured, and for a second image to be captured, outputting guide information that indicates how to adjust the first condition to match a reference condition, the reference condition corresponds to an appearance of the reference object in a reference image captured under the reference condition.

11 Claims, 25 Drawing Sheets

(56) References Cited

U.S. PATENT DOCUMENTS

| | | | |
|---|---|---|---|
| 2009/0207241 A1* | 8/2009 | Igarashi et al. | 348/68 |
| 2011/0279697 A1 | 11/2011 | Shingu et al. | |
| 2011/0282897 A1* | 11/2011 | Li et al. | 707/769 |
| 2012/0327236 A1* | 12/2012 | Kiyohara et al. | 348/148 |
| 2013/0208005 A1 | 8/2013 | Kasahara et al. | |

OTHER PUBLICATIONS

Office Action issued Jun. 29, 2015 in Australian Patent Application No. 2014250736.

Extended Search Report issued Jun. 18, 2015 in European patent Application No. 14189682.9.

Soonmin Bae, et al., Computational Re-Photography, ACM Transactions on Graphics, vol. 29, No. 3, Article 24, XP055194374, Jun. 2010, 15 pages.

Kun-Ting Lee, et al., "Rephotography Using Image Collections", 19th Pacific Conference on Computer Graphics and Applications 2011, vol. 30, No. 7, 2011, XP055194371, 7 pages, Retrieved from the Internet: URL: http://citeseerx.ist.psu.edu/viewdoc/download-?doi=10.1.1.221.2336&rep=rep1&type=pdf.

Australian Office Action issued Mar. 2, 2016 in Patent Application No. 2014250736.

\* cited by examiner

FIG. 5

$$M = \begin{bmatrix} r11 & r12 & r13 & X1c \\ r21 & r22 & r23 & Y1c \\ r31 & r32 & r33 & Z1c \\ 0 & 0 & 0 & 1 \end{bmatrix}$$

$$R = \begin{bmatrix} r11 & r12 & r13 \\ r21 & r22 & r23 \\ r31 & r32 & r33 \end{bmatrix}$$

FIG. 6

$$R1 = \begin{bmatrix} 1 & 0 & 0 \\ 0 & \cos P1c & -\sin P1c \\ 0 & \sin P1c & \cos P1c \end{bmatrix}$$

$$R2 = \begin{bmatrix} \cos Q1c & 0 & \sin Q1c \\ 0 & 1 & 0 \\ -\sin Q1c & 0 & \cos Q1c \end{bmatrix}$$

$$R3 = \begin{bmatrix} \cos R1c & -\sin R1c & 0 \\ \sin R1c & \cos R1c & 0 \\ 0 & 0 & 1 \end{bmatrix}$$

FIG. 10

| TEMPLATE ID | | T1 | |
|---|---|---|---|
| APEX COORDINATE | 0 | (0, 0, 0) | T21 |
| | 1 | (X3m, Y3m, Z3m) | |
| | 2 | (X4m, Y4m, Z4m) | |
| | 3 | (X5m, Y5m, Z5m) | |
| | 4 | (X6m, Y6m, Z6m) | |
| | 5 | ... | |
| | 6 | ... | |
| | 7 | ... | |
| | ... | ... | |
| 1 | APEX ORDER | 1, 3, 4, 5, 7 | T22 |
| | TEXTURE ID | 21 | |
| 2 | APEX ORDER | 2, 3, 4, 5, 6 | |
| | TEXTURE ID | 21 | |
| ... | APEX ORDER | ... | |
| | TEXTURE ID | ... | |

FIG. 11

| CONTENT ID | Xm | Ym | Zm | Pm | Qm | Rm | Jx | Jy | Jz | TEMPLATE ID | MARKER ID | ADDITIONAL INFORMATION |
|---|---|---|---|---|---|---|---|---|---|---|---|---|
| C1 | Xm1 | Ym1 | Zm1 | Pm1 | Qm1 | Rm1 | Jx1 | Jy1 | Jz1 | T1 | M1 | THERE IS A CRACK! |
| C2 | Xm2 | Ym2 | Zm2 | Pm2 | Qm2 | Rm2 | Jx2 | Jy2 | Jz2 | T3 | M1 | |
| | | | | | | | | | | | | |

FIG. 12

| MARKER ID | IMAGING POSITION | IMAGING DIRECTION |
|---|---|---|
| M1 | (Xcon1,Ycon1,Zcon1) | (Pcon1,Qcon1,Rcon1) |
| M2 | (Xcon2,Ycon2,Zcon2) | (Pcon2,Qcon2,Rcon2) |

FIG. 13

| MARKER ID | IMAGE DATA | TIME AND DATE OF IMAGING | IMAGING POSITION | IMAGING DIRECTION |
|---|---|---|---|---|
| M1 | Image1 | 2013.10.1 13:00:00 | (Xcm1,Ycm1,Zcm1) | (Pcm1,Qcm1,Rcm1) |
| M2 | Image2 | 2013.10.1 13:10:05 | (Xcm2,Ycm2,Zcm2) | (Pcm2,Qcm2,Rcm2) |

FIG. 19

| MARKER ID | FIRST FEATURE POINT POSITION | FIRST FEATURE POINT POSITION | FIRST FEATURE POINT POSITION | FIRST FEATURE POINT POSITION |
|---|---|---|---|---|
| M1 | (X1,Y1) | (X2,Y2) | (X3,Y3) | (X4,Y4) |
| M2 | (X11,Y11) | (X22,Y22) | (X33,Y33) | (X44,Y44) |

FIG. 21

| MARKER ID | SCENARIO ID | SCENE ID | IMAGING POSITION | IMAGING DIRECTION |
|---|---|---|---|---|
| M1 | S1 | 001 | (Xcon11,Ycon11,Zcon11) | (Pcon11,Qcon11,Rcon11) |
| M1 | S1 | 002 | (Xcon12,Ycon12,Zcon12) | (Pcon12,Qcon12,Rcon12) |
| M1 | S1 | 003 | (Xcon13,Ycon13,Zcon13) | (Pcon13,Qcon13,Rcon13) |
| M1 | S2 | 001 | (Xcon21,Ycon21,Zcon21) | (Pcon21,Qcon21,Rcon21) |

GUIDING METHOD AND INFORMATION PROCESSING APPARATUS

CROSS-REFERENCE TO RELATED APPLICATION

This application is based upon and claims the benefit of priority of the prior Japanese Patent Application No. 2013-221644, filed on Oct. 24, 2013, the entire contents of which are incorporated herein by reference.

FIELD

The techniques disclosed in the present embodiments are related to carry out guiding when taking an image subject to observation.

BACKGROUND

In order to facilitate maintenance and management services, there is a display apparatus that superimposes a plurality of image data items to generate one still image (for example, Japanese Laid-open Patent Publication No. 2001-14316). The display apparatus evaluates an absolute position of each image and relative positions between the plurality of image data items while generating a still image so as to correspond the position of each other. After a video camera is directed in a predetermined direction, an automobile having the video camera mounted therein runs along an object, thereby collecting a plurality of image data items. In maintenance and management services for a building, a road, a bridge, and the like, the display apparatus is intended to manage structures, such as a bridge through a road, a slope, and the like, as one still image.

SUMMARY

According to an aspect of the invention, a guiding method includes obtaining data of a first image, detecting with a computer reference image data corresponding to a reference object in the data of the first image, calculating with the computer a first condition based on an appearance of the reference object in the first image, the first condition indicating an operational condition of an imaging apparatus when first image was captured, and for a second image to be captured, outputting guide information that indicates how to adjust the first condition to match a reference condition, the reference condition corresponds to an appearance of the reference object in a reference image captured under the reference condition.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates a transformation matrix M from the marker coordinate system to the camera coordinate system and a rotation matrix R in the transformation matrix M;

FIG. 6 illustrates rotation matrices R1, R2, and R3;

FIG. 10 illustrates a template information table;

FIG. 11 illustrates a content information table;

FIG. 12 illustrates an imaging condition information table;

FIG. 13 illustrates a storage image table;

FIG. 19 illustrates an imaging condition information table in the second embodiment;

FIG. 21 illustrates an imaging condition information table in a first modification;

DESCRIPTION OF EMBODIMENTS

In an inspection service and the like, a plurality of images of an object taken at different clock times are compared. In this case, it is preferred that the plurality of images are taken from an approximately identical position for accurate and easy comparison.

With that, for example, an approach of physically fixing a camera is considered in order to take a plurality of images from an approximately identical position. However, when there are a plurality of imaging objects, a camera has to be provided for each imaging object.

In addition, when the display apparatus disclosed in Japanese Laid-open Patent Publication No. 2001-14316 synthesizes a still image, a plurality of image data items to be source of the synthesis is collected by directing a video camera in a predetermined direction by an operator. However, since the direction of the video camera results from judgment of the operator, the synthesized still image does not have to be a still image suitable for the comparison.

With that, in order to observe change with time in a specific object, it is an object of the technique disclosed in the present embodiments to take an image of the object in a specific imaging condition.

Descriptions are given below to detailed embodiments of the present disclosure. It is possible to appropriately combine each embodiment below without contradicting the contents of process. Each embodiment is described below based on the drawings.

Figure 1A:
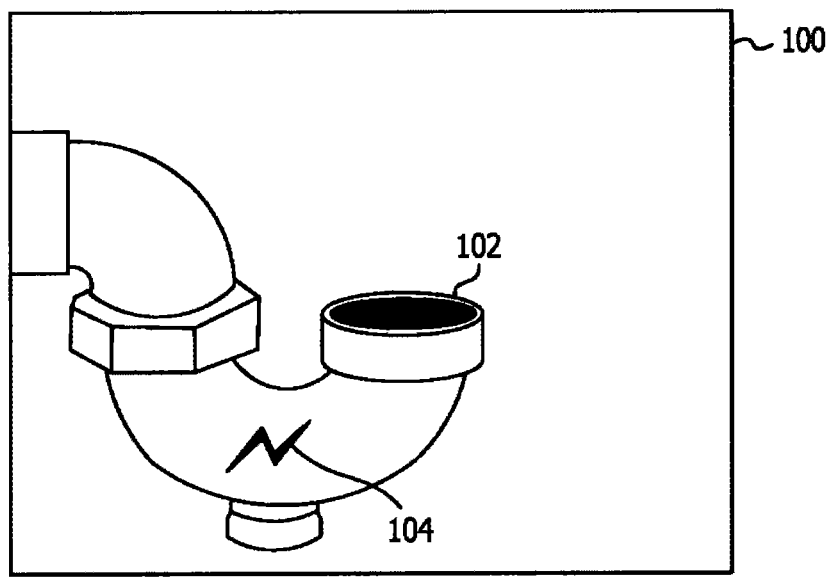
FIGS. 1A and 1B illustrate two images of a same observation object taken at different clock times.
Figure 1B:
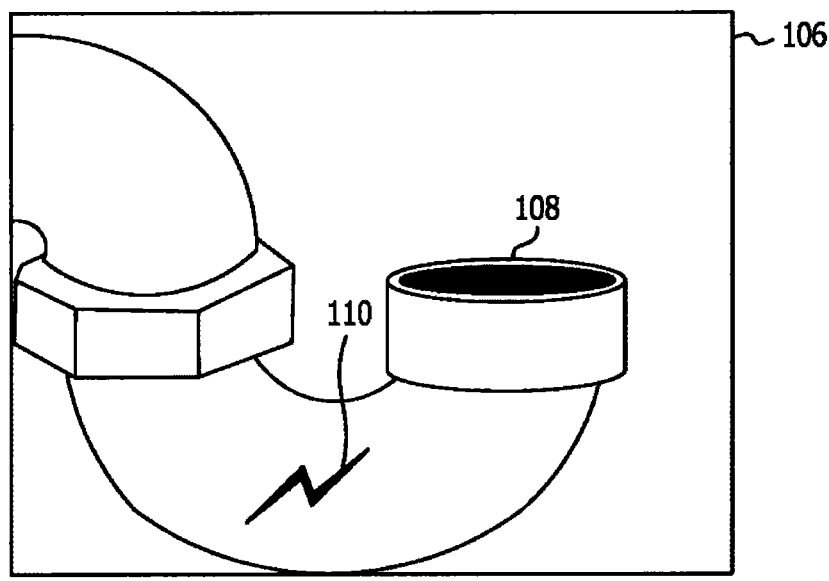

First of all, descriptions are given to an activity to observe change with time in a specific object in an inspection service and maintenance and management services. Hereinafter, the object to be observed is referred to as an observation object. FIGS. 1A and 1B illustrate two images of a same observation object taken at different clock times.

FIGS. 1A and 1B are images in which a crack in piping, which is a same observation object, is taken while imaging conditions for each of the two images are different. The imaging conditions in the present embodiment are an imaging position and an imaging direction. The imaging position is a position of a camera. The imaging direction is a direction of an optical axis of the camera when taking an image.

Specifically, an image 100 in FIG. 1A includes a crack 104 present in piping 102, and an image 106 in FIG. 1B includes a crack 110 present in piping 108. When it is assumed that the image 106 is taken after the image 100, it is difficult for the operator that carries out observation to intrinsically understand whether the size and the position of the crack 110 change from the state of the crack 104. In practice, the piping 102 and the piping 108 are an identical object, and the crack 104 and the crack 110 are also an identical object.

If the image 106 is an image that is taken in imaging conditions similar to the imaging conditions when the image 100 is taken, it is possible that an operator confirms whether there is a change in the crack 104 only by visually comparing the image 100 with the image 106. Although it is also considered to transform the image 100 and the image 106 to easily compared images by image processing, an image processing technique has to be introduced.

Meanwhile, currently, there are increasing cases of introducing an augmented reality (AR) technique for the purpose of efficiency of various services, such as an inspection service and maintenance and management services. The AR technique virtually sets a three dimensional virtual space corresponding to a real space and places model data of a three dimensional object in the virtual space. Then, the AR technique superimposes the virtual space where the model data is placed on a taken image taken by a camera, thereby generating a synthesized image where model data viewed from a certain viewpoint (camera position) is superposition displayed on the taken image in the real space. That is, it is possible that a user browsing a synthesized image recognizes as if there is model data that does not exist in the real space is present in the real space through a display on which the synthesized image is displayed.

In such a manner, according to the AR technique, information gathered by human perception (such as vision) extends. For example, when the model data indicates description information regarding an object present in the real space, instruction information on contents of the activity, attention calling information, and the like, it is possible for the user to understand the information.

Figure 2:
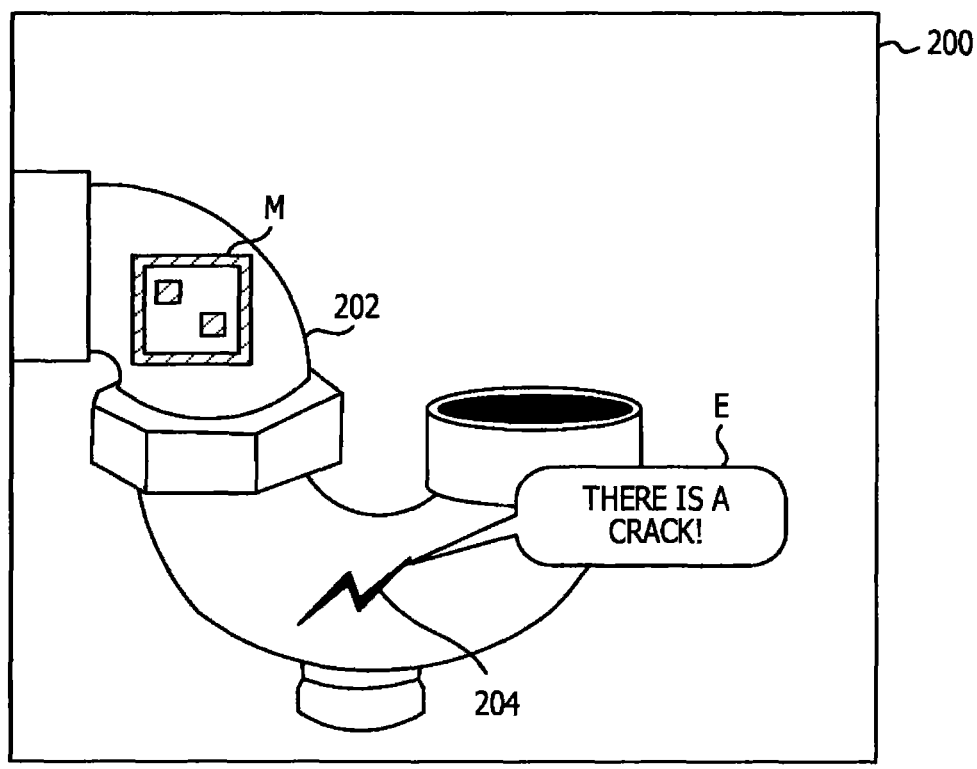
FIG. 2 is a schematic diagram of a synthesized image.

FIG. 2 is a schematic diagram of a synthesized image. A synthesized image 200 includes piping 202 and a crack 204 that are present in the real space as well as an AR object E that is not present in the real space. The piping 202 and the crack 204 correspond to the piping 102 and the crack 104 in FIG. 1A, respectively. The AR object E is three dimensional model data that is placed in the virtual space. The synthesized image 200 also includes a marker M present in the real space. The relationship between the marker M and the AR technique is described later.

When the AR technique is applied to an inspection service, an operator of the inspection service browses the synthesized image 200, thereby allowing understanding that there is the crack 204 in a specific position in the piping 202. That is, compared with a case that the operator directly views the real space, it is possible for the operator to easily understand the presence of the crack 204. In such a manner, the AR technique is introduced as a tool for sharing an informative matter and activity contents, thereby promoting efficiency of an inspection activity in a facility and the like.

Next, the marker M in FIG. 2 is described. In order to display the AR object E in the position of the crack 204 in FIG. 2, the positional relationship between the real space where the crack 204 is present and the virtual space where the AR object E is placed has to be associated. The marker M is used to associate the positional relationship between the real space and the virtual space.

The virtual space where the AR object E is placed is a three dimensional space using the marker M as a reference. That is, the placement position and the placement posture relative to the marker are set in the AR object. Meanwhile, since the marker M also exists in the real space, when the marker M is recognized from the taken image in which the real space is taken, the virtual space and the real space are associated via the marker M. In the AR technique, an object to be a reference for a virtual space, such as the marker M, is referred to as a reference object.

That is, while an AR object is placed in the virtual space, the positional relationship between the camera and the reference object in the real space is obtained based on appearance (picture) of the reference object included in the taken image taken by the camera. Then, positional relationship between the coordinates of respective points of the camera and the AR object in the three dimensional virtual space corresponding to the real space is obtained by the coordinates in the virtual space using the reference object present in the real space as a reference and the positional relationship between the camera and the reference object in the real space. Based on the positional relationship, the picture of the AR object obtained when the reference object is imaged by the camera in the virtual space is determined. Then, the picture of the AR object is displayed by superposition on the taken image.

Figure 3:
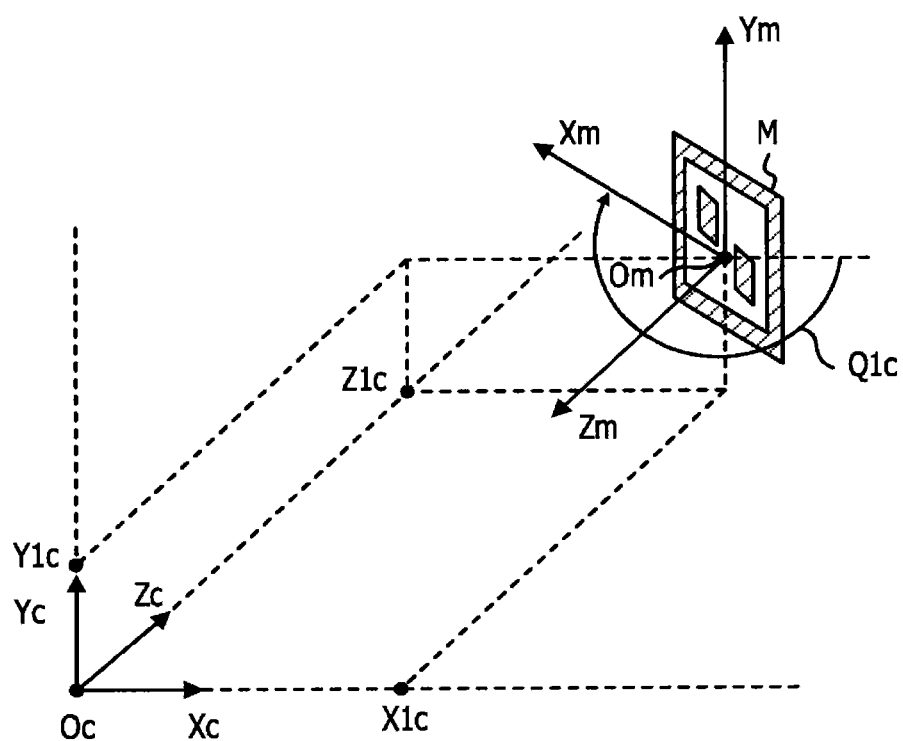
FIG. 3 illustrates relationship between a camera coordinate system and a marker coordinate system.

Here, detailed descriptions are given to a method of calculating a picture of an AR object in order to generate a synthesized image. FIG. 3 illustrates relationship between the camera coordinate system and the marker coordinate system. The marker M exemplified in FIG. 3 is in a square shape and is established in size in advance (for example, the length of each side is 5 cm and the like). Although the marker M illustrated in FIG. 3 is in a square shape, another object in a shape capable of distinguishing the relative positions and the direction from the camera may also be used for the reference object based on a picture obtained by taking from any viewpoint of a plurality of viewpoints.

The camera coordinate system is configured three dimensionally with (Xc, Yc, Zc), and for example, a focus of the camera is assumed to be the origin (origin Oc). For example, an Xc-Yc plane in the camera coordinate system is a plane parallel to an imaging device plane of the camera, and a Zc axis is an axis vertical to the imaging device plane.

The marker coordinate system is configured three dimensionally with (Xm, Ym, Zm), and for example, a center of the marker M is assumed to be the origin (origin Om). For example, an Xm–Ym plane in the marker coordinate system is a plane parallel to the marker M, and a Zm axis is vertical to a plane of the marker M. The origin Om is represented as coordinates V1c (X1c, Y1c, Z1c) in the camera coordinate system. A space configured in the marker coordinate system is the virtual space.

A rotation angle of the marker coordinate system (Xm, Ym, Zm) relative to the camera coordinate system (Xc, Yc, Zc) is represented as rotational coordinates G1c (P1c, Q1c, R1c). P1c is a rotation angle about the Xc axis, Q1c is a rotation angle about the Yc axis, and R1c is a rotation angle about the Zc axis. Since the marker coordinate system exemplified in FIG. 3 rotates only about the Ym axis, P1c and R1c are 0. The respective rotation angles are calculated based on that as what sort of picture a reference object having a known shape is imaged in the taken image subject to the process.

Figure 4:
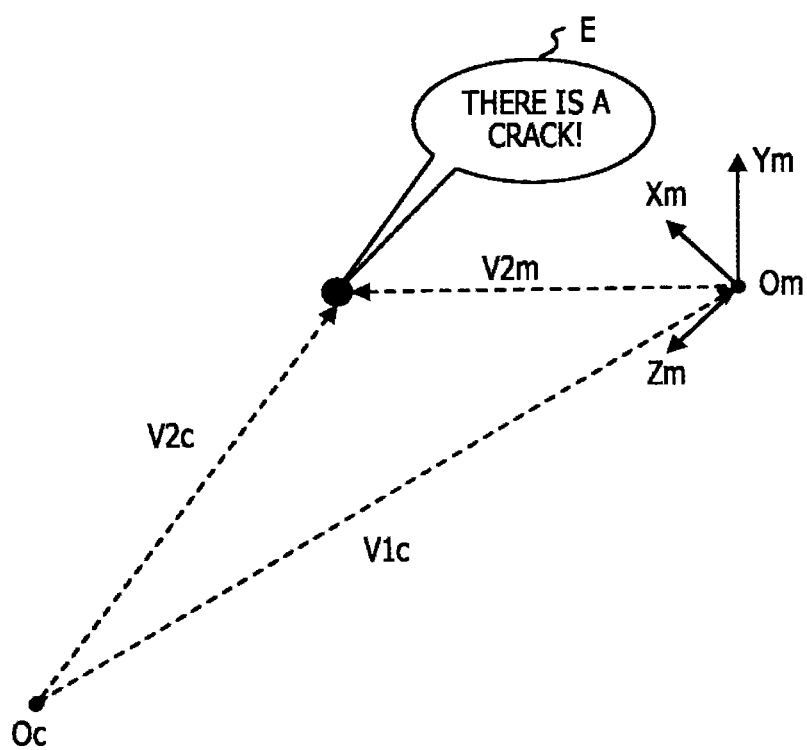
FIG. 4 illustrates an example of an AR object E in the camera coordinate system and the marker coordinate system.

FIG. 4 illustrates an example of an AR object E in the camera coordinate system and the marker coordinate system. The AR object E illustrated in FIG. 4 is an object in a balloon shape and includes text data of "there is a crack!" in a balloon.

A black dot at a tip of the balloon of the AR object E indicates a reference point of the AR object E. The coordinates of the reference point in the marker coordinate system is assumed to be V2m (X2m, Y2m, Z2m). Further, the direction of the AR object E is established by the rotational coordinates G2m (P2m, Q2m, R2m), and the size of the AR object E is established by a magnification D (Jx, Jy, Jz). The rotational coordinates G2m of the AR object E indicates that to what extent the AR object is placed in a state of being rotated relative to the marker coordinate system. For example, when G2m is (0, 0, 0), the AR object is AR displayed parallel to the marker M.

The coordinates of each point that configures the AR object E are coordinates obtained by adjusting coordinates of respective points defined in definition data (AR template), which is a prototype of the AR object E, based on the coordinates V2m, the rotational coordinates G2m, and the magnification D of the reference point.

In the AR template, coordinates of each point is defined as the coordinates of the reference point to be (0, 0, 0). Therefore, as the reference point V2m of the AR object E employing the AR template is set, the coordinates of each point that configures the AR template are moved in parallel based on the coordinates V2m.

Further, each coordinate included in the AR template is rotated based on the set rotational coordinates G2m and is zoomed in or out at the magnification D. That is, the AR object E in FIG. 4 illustrates a state of each point defined in the AR template is configured based on points adjusted based on the coordinates V2m, the rotational coordinates G2m, and the magnification D of the reference point.

In addition, the AR object E may also be generated by initially generating an AR object E', which is a set of points adjusted based on the coordinates V2m and the magnification D of the reference point, and after that rotating each axis of the AR object E' in accordance with the rotational coordinates G2m.

Next, as the AR object E is placed in the marker coordinate system, the coordinates of each point of the AR object E are transformed from the marker coordinate system to the camera coordinate system. Further, in order to project the AR object E on the taken image, transformation from the camera coordinate system to the screen coordinate system is carried out. That is, a picture for superposition display of the AR object E on the taken image is generated.

Descriptions are given below to process to transform a coordinate system. Firstly, model/view transformation to transform the marker coordinate system to the camera coordinate system is described. Regarding each point included in the AR object E, the coordinates in the marker coordinate system are subject to coordinate transformation based on the coordinates V1c in the camera coordinate system of the origin Om of the marker and the rotational coordinates G1c in the marker coordinate system relative to the camera coordinate system, thereby calculating coordinates in the camera coordinate system.

For example, by carrying out the model/view transformation to the reference point V2m of the AR object E, to which point in the camera coordinate system the reference point prescribed in the marker coordinate system corresponds is obtained. In practice, the coordinates V2c in the camera coordinate system corresponding to V2m is obtained.

FIG. 5 illustrates the transformation matrix M from the marker coordinate system to the camera coordinate system and the rotation matrix R in the transformation matrix M. The transformation matrix M is a 4×4 matrix. By a product of the transformation matrix M and a column vector (Xm, Ym, Zm, 1) regarding the coordinates Vm in the marker coordinate system, a column vector (Xc, Yc, Zc, 1) regarding the corresponding coordinates Vc in the camera coordinate system is obtained.

In other words, by carrying out matrix calculation by substituting point coordinates in the marker coordinate system subject to model/view transformation to the column vector (Xm, Ym, Zm, 1), a column vector (Xc, Yc, Zc, 1) including the point coordinates in the camera coordinate system is obtained.

A submatrix (rotation matrix R) of 1st through 3rd rows and 1st through 3rd columns of the transformation matrix M acts on the coordinates in the marker coordinate system, thereby carrying out a rotation operation to match the direction of the marker coordinate system and the direction of the camera coordinate system. A submatrix of 1st through 3rd rows and 4th columns of the transformation matrix M acts, thereby carrying out a translation operation to match the direction of the marker coordinate system and the position of the camera coordinate system.

FIG. 6 illustrates rotation matrices R1, R2, and R3. The rotation matrix R illustrated in FIG. 5 is calculated by a product (R1·R2·R3) of the rotation matrices R1, R2, and R3. The rotation matrix R1 indicates rotation of the Xm axis relative to the Xc axis. The rotation matrix R2 indicates rotation of the Ym axis relative to the Yc axis. The rotation matrix R3 indicates rotation of the Zm axis relative to the Zc axis.

The rotation matrices R1, R2, and R3 are generated based on the picture of the reference object in the taken image. That is, the rotation angles P1c, Q1c, and R1c are calculated as described above based on that as what sort of picture a reference object having a known shape is imaged in the taken image subject to the process. Then, based on the rotation angles P1c, Q1c, and R1c, the respective rotation matrices R1, R2, and R3 are generated.

As just described, the coordinates (Xm, Ym, Zm) in the marker coordinate system of each point that configures the AR object E are transformed to the coordinates (Xc, Yc, Zc) in the camera coordinate system by model/view transformation based on the transformation matrix M. The coordinates (Xc, Yc, Zc) obtained by the model/view transformation indicate a relative position from the camera when a camera is assumed to be virtually present in a virtual space where the AR object E is present.

Next, the coordinates in the camera coordinate system of each point of the AR object E are transformed to a screen coordinate system. Transformation of a camera coordinate system to a screen coordinate system is referred to as perspective transformation. A screen coordinate system is configured two dimensionally with (Xs, Ys). The screen coordinate system (Xs, Ys) has, for example, a center of a taken image obtained by imaging process of a camera as the origin (origin Os). Based on coordinates in the screen coordinate system of each point obtained by the perspective transformation, a picture for superposition display of the AR object E on the taken image is generated.

The perspective transformation is carried out based on, for example, a focal length f of the camera. The Xs coordinate of the coordinates in the screen coordinate system corresponding to the coordinates (Xc, Yc, Zc) in the camera coordinate system is obtained by the following formula 1. The Ys coordinate of the coordinates in the screen coordinate system corresponding to the coordinates (Xc, Yc, Zc) in the camera coordinate system is obtained by the following formula 2.

$$Xs = f \cdot Xc/Zc \quad \text{(Formula 1)}$$

$$Ys = f \cdot Yc/Zc \quad \text{(Formula 2)}$$

Based on the coordinates obtained by the perspective transformation, a picture of the AR object E is generated. The AR object E is generated by mapping a texture on a plane obtained by interpolating a plurality of points that configure the AR object E. In the AR template to be a source of the AR object E, which point is to be interpolated to form a plane and which texture is to be mapped on which plane are defined.

The coordinates in the taken image corresponding to the coordinates in the marker coordinate system are calculated by the model/view transformation and the perspective transformation to utilize the coordinates, thereby generating a picture of the AR object E in accordance with the viewpoint of the camera. The picture of the AR object E thus generated is called as a projection image of the AR object E. The projection image of the AR object E is synthesized to the taken image, thereby generating a synthesized image. Then, the synthesized image extends visual information provided to a user.

In addition, in another embodiment, a projection image of the AR object E is displayed on a transmissive display. In this embodiment as well, a picture in the real space that a user obtains by transmission through a display matches the projection image of the AR object E, so that the visual information provided to the user extends.

Here, the inventor paid attention to capability of estimating the imaging position and the imaging direction relative to the reference object by utilizing the picture of the reference object in the image. Then, the inventor found that it is possible to take a plurality of images subject to observation in a specific imaging condition by utilizing the AR technique as long as the positional relationship between the reference object and the observation object is unchanged.

With that, in the technique according to the present embodiment, guidance is performed in an embodiment capable of understanding a difference between an imaging position and an imaging direction (imaging conditions) that are specified in advance and an imaging position and an imaging direction (imaging conditions) of an input image. Therefore, the technique according to the present embodiment leads a user to be guided to the imaging position and the imaging direction that are specified in advance. The imaging position and the imaging direction relative the reference object may be considered as an imaging position and an imaging direction relative to the observation object.

Figure 7A:
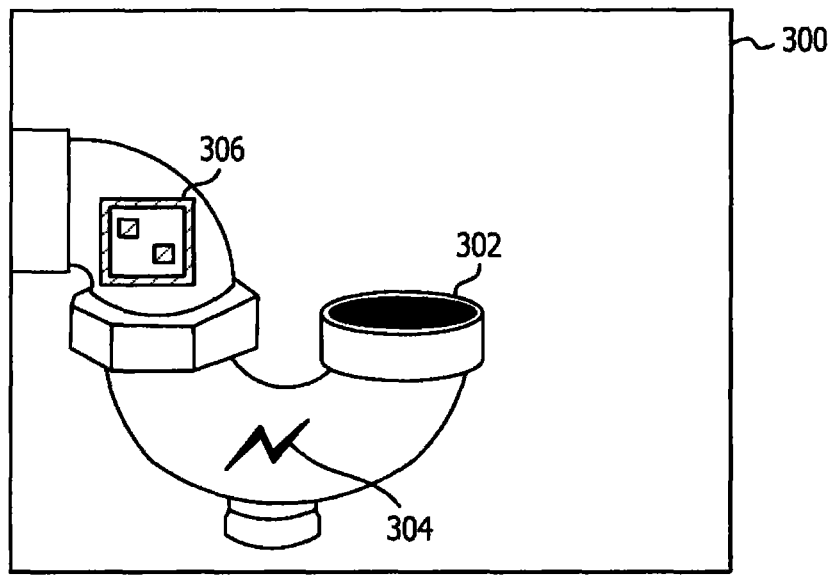
FIGS. 7A and 7B illustrate images taken in different imaging conditions.
Figure 7B:
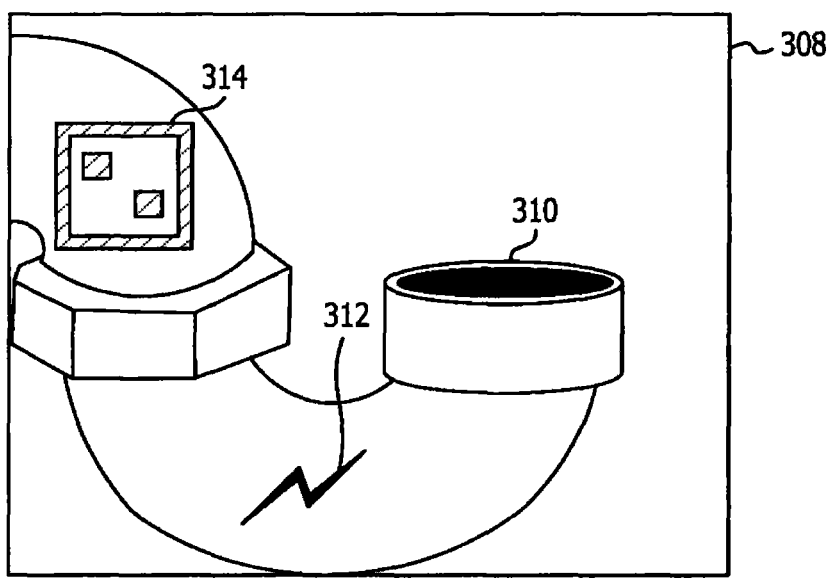

FIGS. 7A and 7B illustrate images taken in different imaging conditions. FIGS. 7A and 7B are taken images in which the real space is taken similar to FIGS. 1A and 1B. It is to be noted that, different from FIGS. 1A and 1B, a marker is attached to the piping to apply the AR technique.

Further, in the present embodiment, images taken at a fixed frame interval by a camera is referred to as taken images. While the taken images are temporarily stored in a buffer of an information processing apparatus (described later), an image to observe change with time in the observation object is stored separately in a memory as a storage image.

An image 300 in FIG. 7A is an image to be a reference when observing change with time in a crack 304, which is an observation object. Accordingly, an operator compares with another image to confirm whether the crack 304 in the image 300 extends or not. Here, as described above, it is preferred that the other image is taken in imaging conditions similar to the image 300. The image 300 includes piping 302, the crack 304, and a marker 306.

Next, although an image 308 in FIG. 7B is an image including a crack 312, which is an observation object, the image 308 is not appropriate as an image to be compared with the image 300. This is because the picture of the marker 306 in the image 300 and the picture of a marker 314 in the image 308 are present in different size and in different positions, so that the image 308 is supposed to be taken in an imaging position different from the image 300. When the imaging direction is also different, the shape of the picture of the marker 306 turns out to be different from the shape of the picture of the marker 314 as well.

With that, the technique disclosed in the present embodiment leads an operator to take an image in imaging conditions matching the imaging conditions of the image 300 to be the reference. It is to be noted that the "matching" in the present embodiment includes not only perfect matching but also approximate matching. That is, the matching may be to the extent that a person observing the change with time in the observation object is capable of recognizing the plurality of images to be compared as images taken in the identical imaging conditions.

[First Embodiment]

Figure 8:
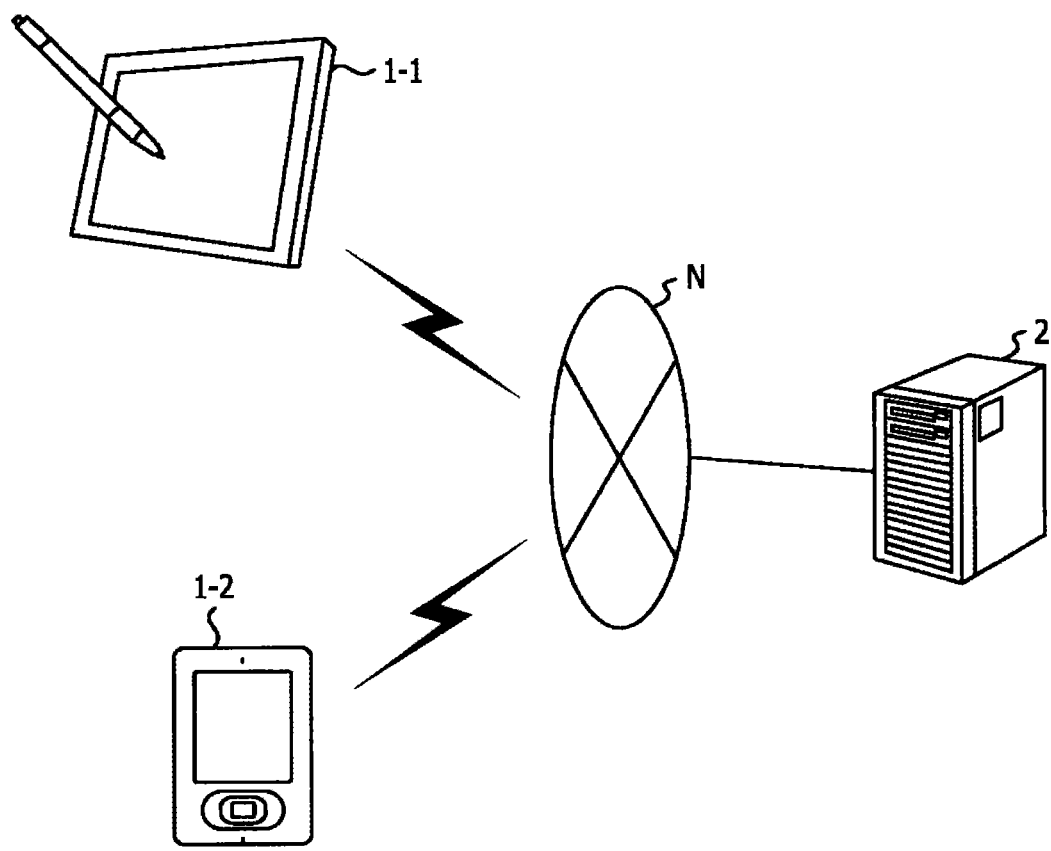
FIG. 8 is a system configuration diagram according to a first embodiment.

Firstly, descriptions are given to detailed process and configuration of an information processing apparatus and the like according to the first embodiment. FIG. 8 is a system configuration diagram according to the first embodiment. The system includes a communication terminal 1-1, a communication terminal 1-2, and a management apparatus 2. Hereinafter, the communication terminal 1-1 and the communication terminal 1-2 are collectively referred to as an information processing apparatus 1.

The information processing apparatus 1 is a computer, such as a tablet PC and a smartphone, having a camera, for example. For example, the information processing apparatus 1 is held by an operator that carries out an inspection activity. The information processing apparatus 1 generates a synthesized image and also performs guidance of imaging conditions. Further, the information processing apparatus 1 communicates with the management apparatus 2 via the network N. The management apparatus 2 is, for example, a server computer, and manages a plurality of information processing apparatuses 1. The network N is, for example, the Internet.

Firstly, when recognizing a reference object in the taken image, the information processing apparatus 1 sends identification information (for example, marker ID) to identify the recognized reference object to the management apparatus 2. When receiving the identification information from the information processing apparatus 1, the management apparatus 2 provides imaging condition information corresponding to the identification information to the information processing apparatus 1. The imaging condition information is information indicating the imaging position and the imaging direction to be the reference.

The information processing apparatus 1 estimates imaging conditions based on the picture of the reference object recognized from the taken image and also performs guidance so as to allow the operator to understand a difference between the estimated imaging conditions and the imaging conditions to be the reference.

For example, the information processing apparatus 1 obtains a difference between the estimated imaging position and the imaging position to be the reference and displays an arrow prompting movement in a direction filling the difference as a guide on the taken image. When the operator alters the imaging position in accordance with the guide display, thereby approximately matching the new imaging position and the imaging position to be the reference, the information processing apparatus 1 obtains a taken image at the time of approximate matching as a storage image. In addition, when matching approximately, the information processing apparatus 1 instructs the operator to carry out an imaging determination input in the current imaging position. For example, the information processing apparatus 1 instructs pressing of a shutter button.

Then, the information processing apparatus 1 sends the obtained storage image and time and date of the obtainment to the management apparatus 2. The management apparatus 2 stores them together with the storage image received from the information processing apparatus 1.

In addition, in the present embodiment, the management apparatus 2 provides, as well as the imaging condition information, information desired to generate the synthesized image (content information and template information) to the information processing apparatus 1. Details are described later. The information processing apparatus 1 generates a synthesized image in the method described above and also displays the image on the display. Upon this, it is possible that the operator browses an AR content (for example, a projection image on which the object E in FIG. 4 is projected) to understand the position of the presence of a crack. In addition, an AR content including a message indicating contents of an activity of "image the crack" may also be displayed further.

The timing to provide the imaging condition information, the content information, the template information, and the like from the management apparatus 2 to the information processing apparatus 1 is not limited to after recognition of the reference object in the information processing apparatus 1. For example, the imaging condition information and the like related to a plurality of reference objects may also be provided from the management apparatus 2 to the information processing apparatus 1 before recognition of the reference objects.

Figure 9:
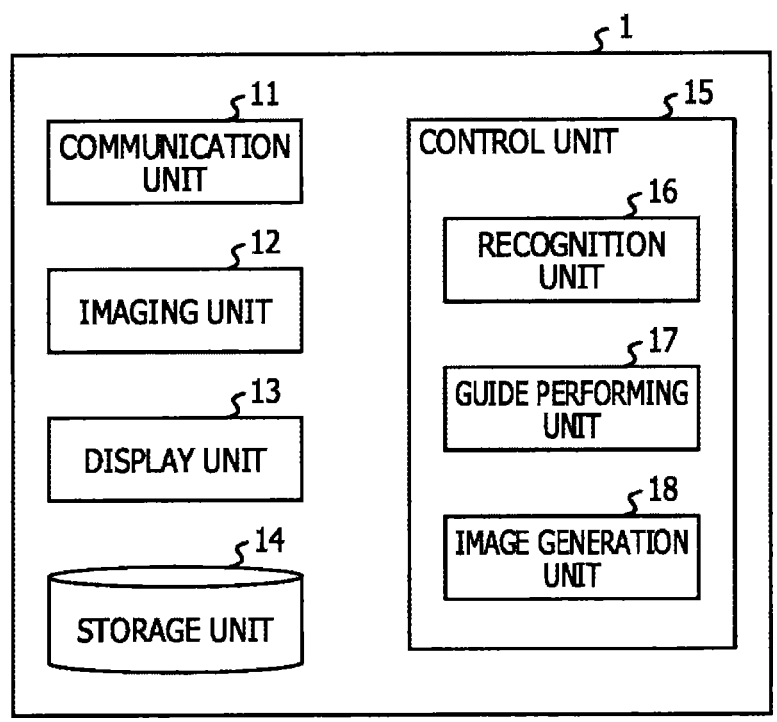
FIG. 9 is a functional block diagram of an information processing apparatus according to the first embodiment.

Next, descriptions are given to functional configuration of the information processing apparatus 1. FIG. 9 is a functional block diagram of an information processing apparatus according to the first embodiment. The information processing apparatus 1 includes a communication unit 11, an imaging unit 12, a display unit 13, a storage unit 14, and a control unit 15.

The communication unit 11 carries out communication with another computer. For example, the communication unit 11 receives the imaging condition information, the content information, and the template information from the management apparatus 2. After a storage image is stored, the communication unit 11 also sends the storage image to the management apparatus 2.

The imaging unit 12 takes an image at a fixed frame interval. The camera is equivalent to the imaging unit 12. Then, the imaging unit 12 inputs a taken image to the control unit 15. The display unit 13 displays an image. For example, the display unit 13 displays a synthesized image including a projection image of an AR object and a synthesized image including guide display.

The storage unit 14 stores various types of information under the control by the control unit 15. The storage unit 14 stores the content information, the template information, the imaging condition information, and the like. Further, the storage unit 14 stores a storage image under the control by the control unit 15.

The control unit 15 controls various types of process of the entire information processing apparatus 1. The control unit 15 includes a recognition unit 16, a guide performing unit 17, and an image generation unit 18. The recognition unit 16 recognizes the reference object from the input image. In the present embodiment, the recognition unit 16 recognizes a marker. For example, the recognition unit 16 recognizes the marker using a recognition template in which the shape of marker is given to carry out template matching.

Further, the recognition unit 16 obtains the identification information to identify a reference object. For example, a marker ID is obtained. Reading of the marker ID is carried out based on, for example, brightness information within an image region that corresponds to the marker. For example, when the marker is in a quadrilateral shape, the recognition unit 16 decides whether each region that is obtained by dividing the quadrilateral image region recognized as the marker, where a region having brightness of not less than a predetermined value is "1" and a region having brightness of less than the predetermined value is "0", is "1" or "0" in a predetermined order to set the column of the information obtained by the decision as the marker ID.

In addition, for example, placement of the region having brightness of not less than a predetermined value and the region of less than the predetermined value in a quadrilateral frame may also be patterned to let the recognition unit 16 use the marker ID corresponding to the pattern. Further, the numeral range to be employed as the marker ID may also be established in advance to decide as the marker ID is not read when the read marker ID is not in the numeral range.

Next, the recognition unit 16 calculates positional coordinates and rotational coordinates of a reference object based on the picture of the reference object. The positional coordinates and the rotational coordinates of the reference object are values in the camera coordinate system. Further, the recognition unit 16 generates the transformation matrix M based on the positional coordinates and the rotational coordinates of the reference object. Details are as already described.

The guide performing unit 17 generates guide information that allows understanding of a difference between a first imaging condition estimated based on a picture of the reference object in the input image and a second imaging condition specified in advance. For example, the guide performing unit 17 estimates an imaging position of the input image based on the picture of the reference object in the input image. Then, the guide performing unit 17 calculates a difference between the appropriate imaging position set in the imaging condition information and the imaging position of the input image. Then, the guide performing unit 17 generates guide information to draw an arrow indicating a direction of filling the difference. The length and the like of the arrow may also be adjusted in accordance with the magnitude of the difference.

Here, a method of estimating an imaging position, which is one of the imaging conditions, is described. As a first method, a position (Xc1, Yc1, Zc1) of the reference object calculated by the recognition unit 16 is utilized. The position (Xc1, Yc1, Zc1) of the reference object is a position of the reference object in the camera coordinate system, where the focus of the camera is the origin.

As illustrated in FIG. 3, when the position of the reference object in the camera coordinate system is (Xc1, Yc1, Zc1), the position of the focus of the camera in the marker coordinate system, where the center of the reference object is the origin, becomes (−Xc1, −Yc1, −Zc1), on the contrary. That is, it is possible that the guide performing unit 17 estimates (−Xc1, −Yc1, −Zc1) as the imaging position (position of the focus of the camera) in the marker coordinate system.

As a second method, the transformation matrix M generated by the recognition unit 16 is utilized. Specifically, the guide performing unit 17 obtains a column vector Am (Xm, Ym, Zm, 1) by a product of an inverse matrix $M^{-1}$ of the transformation matrix M from the marker coordinate system to the camera coordinate system and the column vector Ac (Xc, Yc, Zc, 1). Specifically, the guide performing unit 17 obtains the column vector Am (Xm, Ym, Zm, 1) by the following formula 3.

$$Am = M^{-1} \cdot Ac \quad \text{(Formula 3)}$$

When the imaging position is considered to approximately match the origin in the camera coordinate system, the imaging position is (0, 0, 0). Therefore, by substituting a column vector (0, 0, 0, 1) to Ac, it is possible that the guide performing unit 17 obtains to which point in the marker coordinate system the origin in the camera coordinate system corresponds, by the formula 3. That is, it is possible that the guide performing unit 17 estimates an imaging position in the marker coordinate system.

Next, an imaging direction, which is one of the imaging conditions, is described. It is possible that the guide performing unit 17 estimates an imaging direction of an input image as (−P1c, −Q1c, −R1c) based on rotational coordinates (P1c, Q1c, R1c) of the reference object calculated by the recognition unit 16.

As above, it is possible that the guide performing unit 17 estimates imaging conditions of the input image. Hereinafter, the imaging position of the input image is supposed to be (Xcm, Ycm, Zcm). For example, (Xcm, Ycm, Zcm) is (−Xc1, −Yc1, −Zc1). The imaging position included in the imaging condition information is supposed to be (Xcon, Ycon, Zcon). The imaging direction of the input image is supposed to be (Pcm, Qcm, Rcm). For example, (Pcm, Qcm, Rcm) is (−Pc1, −Qc1, −Rc1). The imaging direction included in the imaging condition information is supposed to be (Pcon, Qcon, Rcon).

Next, the guide performing unit 17 calculates the difference between the imaging conditions of the input image and the imaging conditions included in the imaging condition information. When only either one of the imaging position and the imaging direction is employed as the imaging condition, the difference is calculated only for the imaging position or the imaging direction.

For example, the guide performing unit 17 calculates a difference (Xcon−Xcm, Ycon−Ycm, Zcon−Zcm) for each coordinate value in the marker coordinate system. When a value of the difference on the X axis is a positive value, the guide performing unit 17 generates an arrow indicating a left direction to a plane parallel to the display unit 13 (display) included in the information processing apparatus 1. When the value of the difference on the X axis is a negative value, the guide performing unit 17 generates an arrow indicating a right direction.

When a value of the difference on the Y axis is a positive value, the guide performing unit 17 generates an arrow indicating an upward direction to a plane parallel to the display unit 13 (display) included in the information processing apparatus 1. When the value of the difference on the Y axis is a negative value, the guide performing unit 17 generates an arrow indicating a downward direction.

When a value of the difference on the Z axis is a positive value, the guide performing unit 17 generates an arrow indicating a forward direction to a plane vertical to the display unit 13 (display) included in the information processing apparatus 1. When the value of the difference on the Z axis is a negative value, the guide performing unit 17 generates an arrow indicating a backward direction.

Further, the guide performing unit 17 may also generate sound prompting alteration of the imaging conditions as the guide information instead of the arrow. For example, when the value of the difference on the X axis is a positive value, the guide performing unit 17 generates sound of "move to the left". In this case, the guide information thus generated is outputted from, for example, a sound output unit (not illustrated) such as a speaker.

Further, the guide performing unit 17 calculates a difference between the rotational coordinates (Pcm, Qcm, Rcm) of the input image and the appropriate rotational coordinates (Pcon, Qcon, Rcon) set in the imaging condition information on each rotation axis, in the imaging direction as well. Then, the guide performing unit 17 generates guide information prompting rotation of the information processing apparatus in accordance with the difference in the rotational coordinates. For example, when a value of Pcon−Pcm is positive because P1c indicates the rotation angle about the Xc axis, the guide performing unit 17 generates guide information so as to rotate the information processing apparatus 1 counterclockwise on the axis of ordinate that configures a plane parallel to the imaging device plane of the camera.

Further, when the difference becomes not more than a threshold, the guide performing unit 17 obtains a storage image. For example, the guide performing unit 17 stores an input image when the difference becomes not more than the threshold as the storage image in the storage unit 14. Further, the guide performing unit 17 may also output a message of finishing imaging subject to observation to the operator via the display unit 13.

Alternatively, when the difference becomes not more than the threshold, the guide performing unit 17 may also request the operator to press a determination button to image an observation object in the imaging position via the display unit 13. Then, the guide performing unit 17 obtains an image from the imaging unit 12 to store the image as the storage image in the storage unit 14.

The guide performing unit 17 associates the image data of the storage image with the time and date of imaging to store them in the storage unit 14. Further, the guide performing unit 17 may also store the marker ID and information indicating the imaging conditions of the storage image in the storage unit 14.

Next, the image generation unit 18 generates an image to be displayed on the display unit 13. For example, the image generation unit 18 generates a synthesized image obtained by superposition display of the AR content on the taken image. The synthesized image is generated based on the transformation matrix M outputted by the recognition unit 16, and the content information and the template information obtained from the management apparatus 2 by the communication unit 11.

The image generation unit 18 generates the image to display the guide information based on the guide information generated by the guide performing unit 17. For example, the image generation unit 18 synthesizes the guide display on the taken image. The image generation unit 18 may also synthesize the guide display on the synthesized image including the projection image of the AR object.

Next, descriptions are given to various types of information stored in the storage unit 14. From the management apparatus 2, the template information, the content information, and the imaging condition information are assumed to be provided to the information processing apparatus 1. Then, the various types of information thus provided are stored in the storage unit 14.

FIG. 10 illustrates a template information table. The template information table stores template information to define each template applied as model data of the AR object. The template information includes identification information of a template (template ID), coordinate information T21 of each apex that configures the template, and configuration information T22 of each plane that configures the template (specification of apex order and texture ID).

The apex order indicates the order of apexes that configure a plane. The texture ID indicates the identification information of a texture mapped on the plane. A reference point of the template is, for example, a 0th apex. By the information indicated in the template information table, the shape and the pattern of the three dimensional model are established.

FIG. 11 illustrates a content information table. The content information table stores content information regarding the AR content. In the content information table, a content ID of the AR content, the positional coordinates (Xm, Ym, Zm) of the reference point in the marker coordinate system, the rotational coordinates (Pm, Qm, Rm) in the marker coordinate system, the magnification D (Jx, Jy, Jz) using the AR template as a reference, the template ID of the AR template, the marker ID, and additional information are stored.

When image generation unit 18 generates a projection image of the AR object E, the AR template illustrated in FIG. 10 is adjusted based on the content information (the position, the direction, and the size). In other words, specification of the position, the posture, and the size of the AR object E is carried out by setting the information managed by the content information table. The additional information is information added to the AR object E. As the additional information, a text, access information to a web page and a file, and the like are used.

For example, an AR content having a content ID of "C1" illustrated in FIG. 11 is configured with each apex obtained by zooming each apex coordinate defined as the AR template "T1" in or out in the respective directions of Xm, Ym, Zm, rotating at the rotational coordinates (Pm1, Qm1, Rm1), and translating in accordance with the positional coordinates (Xm1, Ym1, Zm1). The AR content further carries out mapping of the additional information on a plane that configures the AR object E.

Next, FIG. 12 illustrates an imaging condition information table. The imaging condition information table stores imaging condition information regarding the imaging conditions to be the reference when imaging the observation object. In the imaging condition information table, the marker ID, the imaging condition (Xcon, Ycon, Zcon) regarding the imaging position, and the imaging condition (Pcon, Qcon, Rcon) regarding the imaging direction are stored.

The imaging conditions may be information set by an administrator in advance and may also be the imaging position and the imaging direction of the image of the observation object that is taken initially. For example, as illustrated in FIG. 7A, it is assumed that the operator finds the presence of the crack 304 and takes the image 300. At this time, the imaging conditions to be the reference are generated based on the picture of the marker 306 (reference object) in the image 300. The imaging conditions are generated in a method similar to the calculation method when the guide performing unit 17 estimates the imaging position of the input image.

Next, descriptions are given to a storage image table that stores a storage image. FIG. 13 illustrates the storage image table. The storage image table stores the marker ID, the image data, the time and date of imaging, and the imaging conditions in which the storage image is taken, in association. In the example of FIG. 13, the imaging position and the imaging direction are stored as the imaging conditions. The image data may also be information indicating a location of image data storage, not the image data itself.

Figure 14:
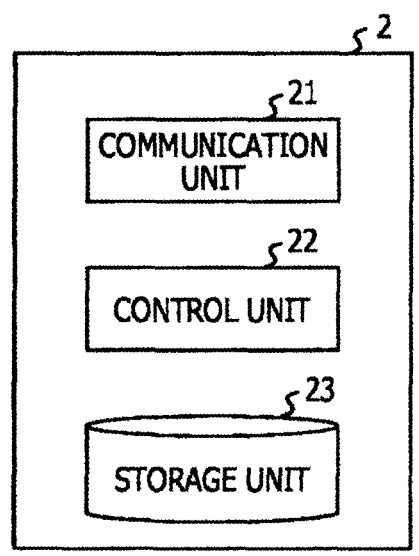
FIG. 14 is a functional block diagram of a management apparatus.

Next, descriptions are given to functional configuration of the management apparatus 2 according to the first embodiment. FIG. 14 is a functional block diagram of the management apparatus. The management apparatus 2 has a communication unit 21, a control unit 22, and a storage unit 23. The communication unit 21 is a processing unit to communicate with another computer. For example, the communication unit 21 carries out communication with the information processing apparatus 1.

The control unit 22 is a processing unit to control various types of process of the entire management apparatus 2. For example, the control unit 22 reads the content information, the template information, and the imaging condition information out of the storage unit 23 in accordance with a request from the information processing apparatus 1. The request includes the identification information (marker ID) of the reference object recognized by the information processing apparatus 1. Specifically, the control unit 22 reads the content information and the imaging condition information corresponding to the identification information out of the storage unit 23. The template information of the template applied to the content is also read out together.

Then, the control unit 22 controls the communication unit 21 and sends the various types of information that are read out to the information processing apparatus 1. In addition, when receiving the storage image from the information processing apparatus 1 via the communication unit 21, the control unit 22 stores the storage image in the storage unit 23.

The storage unit 23 stores various types of information. For example, the storage unit 23 stores the template information by the template information table similar to FIG. 10. In addition, the storage unit 23 stores the content information by the content information table similar to FIG. 11. Further, the storage unit 23 stores the imaging condition information by the imaging condition information table similar to FIG. 12. In addition, the storage unit 23 stores the storage image by the storage image table similar to FIG. 13.

Figure 15:
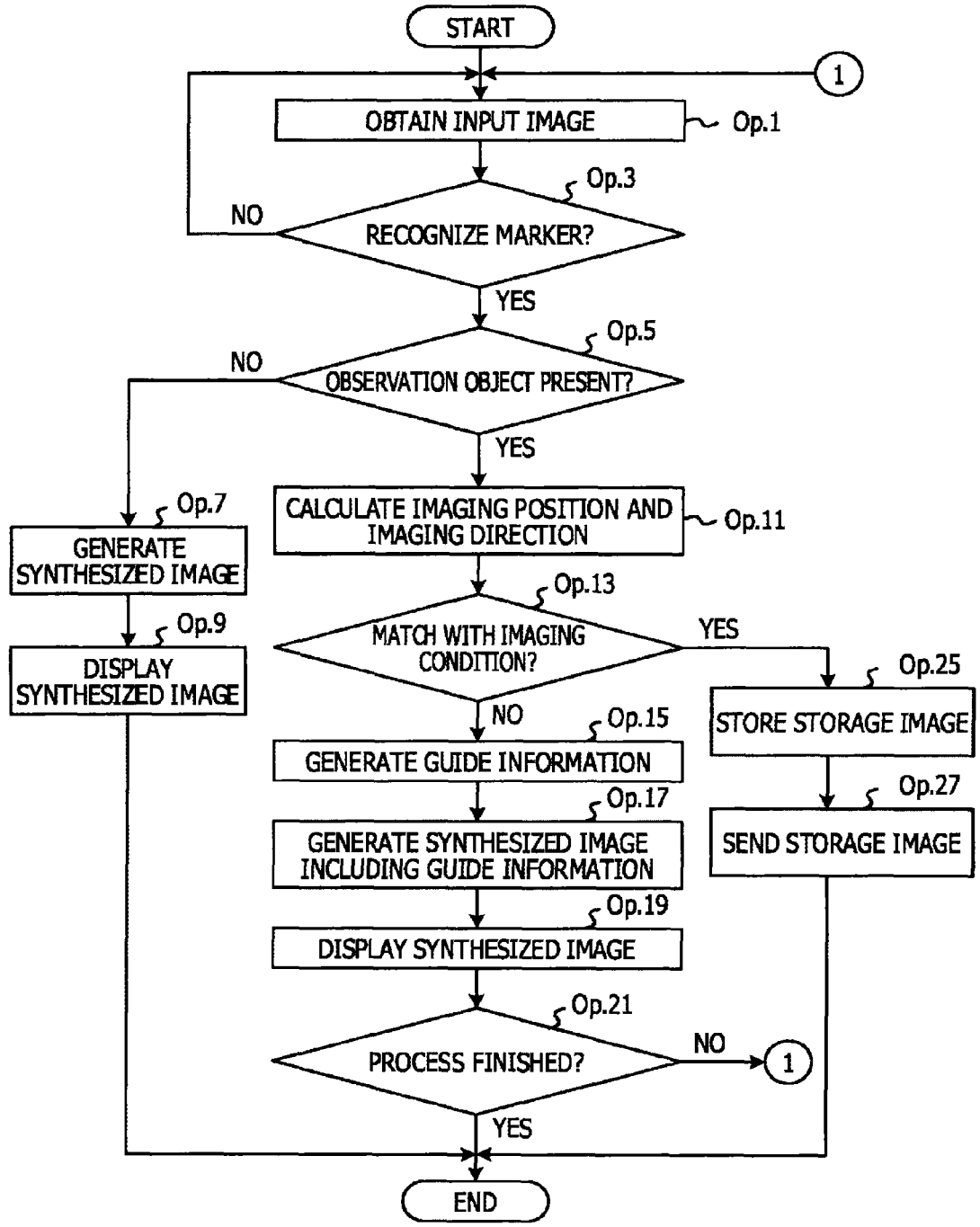
FIG. 15 illustrates a flowchart of guiding process according to the first embodiment.

Next, descriptions are given to a flow of guiding process performed by a guide program. FIG. 15 illustrates a flowchart of guiding process. The guide program is a program in which a procedure of the guiding process performed by the control unit 15 of the information processing apparatus 1 is defined.

The control unit 15 carries out preprocess prior to performance of the guiding process. In the preprocess, the template information, the content information, and the imaging condition information are obtained from the management apparatus 2. In addition, activation instruction of an AR display mode is carried out. The control unit 15 causes, for example, the imaging unit 12 to start imaging at a predetermined temporal interval and causes the recognition unit 16 to start marker sensing process regarding the taken image. Further, the control unit 15 displays the taken image taken by the imaging unit 12 on the display unit 13.

When imaging is instructed from the control unit 15, the imaging unit 12 obtains an image generated by the imaging device at a predetermined temporal interval and stores the image thus obtained in the storage unit 14. In the storage unit 14, a buffer to store a plurality of images is provided, and the image taken by the imaging unit 12 is stored in the buffer. For example, the buffer provided in the storage unit 14 is a buffer for display in which the image to be displayed by the display unit 13 is stored. The images stored in the buffer for display are displayed on the display unit 13 sequentially.

The recognition unit 16 obtains an image stored in the buffer provided in the storage unit 14 (Op. 1). The image obtained here becomes the input image. The recognition unit 16 decides whether a marker is recognized from the input image (Op. 3). For example, the recognition unit 16 recognizes a marker by using a template giving a shape of the marker to carry out template matching.

In the recognition of the marker (Op. 3), the recognition unit 16 carries out reading of the marker ID of the marker. In addition, the recognition unit 16 calculates the position (Xc1, Yc1, Zc1) of the reference object and the rotational coordinates (P1c, Q1c, R1c) of the reference object in the camera coordinate system based on the picture of the marker in the input image. In addition, the recognition unit 16 generates the transformation matrix M based on the position (Xc1, Yc1, Zc1) of the reference object and the rotational coordinates (P1c, Q1c, R1c) of the reference object.

When a marker is not recognized (no in Op. 3), the recognition unit 16 goes back to Op. 1. In contrast, when a marker is recognized (yes in Op. 3), the recognition unit 16 outputs the marker ID of the recognized marker to the guide performing unit 17 and the guide performing unit 17 decides presence of the observation object (Op. 5). That is, the guide performing unit 17 refers to the imaging condition information table and decides whether imaging conditions corresponding to the obtained marker ID are stored. When the conditions are stored, it is decided that an observation object associated with the marker recognized from the input image is present.

When there is no observation object (no in Op. 5), the image generation unit 18 generates a synthesized image in which a projection image of the AR content is superposed on the input image using the content information, the template information, and the transformation matrix M (Op. 7). Then, the display unit 13 displays the synthesized image (Op. 9). Then, the process is finished.

Here, when there is no observation object (no in Op. 5), the guide performing unit 17 may also decide whether or not to perform addition of the observation object. For example, when a user newly finds a crack, an input to add the crack as the observation object is performed. The guide performing unit 17 generates imaging conditions using an output by the recognition unit 16. The generated imaging conditions are sent to the management apparatus 2 together with the marker ID to be managed.

In contrast, when there is an observation object (yes in Op. 5), the guide performing unit 17 calculates the imaging position and the imaging direction using the position (Xc1, Yc1, Zc1) and the rotational coordinates (P1c, Q1c, R1c) of the reference object in the camera coordinate system obtained from the recognition unit 16 (Op. 11). For example, the guide performing unit 17 calculates (−Xc1, −Yc1, −Zc1) as the imaging position (Xcm, Ycm, Zcm) of the input image based on the position (Xc1, Yc1, Zc1) of the reference object in the camera coordinate system.

Then, the guide performing unit 17 compares, for matching, the imaging conditions to be the reference with the calculated imaging conditions (Op. 13). Here, matching may be perfect matching and may also be approximate matching. For the threshold to decide whether or not to match, a value considering precision of human vision is set.

When the imaging conditions to be the reference does not match the calculated imaging conditions (no in Op. 13), the guide performing unit 17 generates guide information (Op. 15). For example, the guide information is information to draw an arrow prompting movement in a direction filling the difference between the imaging position included in the imaging conditions and the calculated imaging position.

Next, the image generation unit 18 generates a synthesized image using the content information, the template information, and the transformation matrix M and also draws guide display on the synthesized image based on the guide information (Op. 17). The position of drawing the guide information is arbitrary. For example, the guide display is carried out near the center or the like of the synthesized image.

Then, the display unit 13 displays the synthesized image including the guide display (Op. 19). After that, the control unit 15 decides whether to finish the process (Op. 21). For example, when an input of finishing the process is carried out by the user, finishing of the process is decided. When the process is finished (yes in Op. 21), the series of guiding process is finished directly. In contrast, when the process is not finished (no in Op. 21), the process goes back to Op. 1.

In addition, when the imaging conditions to be the reference match the calculated imaging conditions in Op. 13 (yes in Op. 13), the guide performing unit 17 stores the input image obtained in Op. 1 as the storage image (Op. 25). The guide performing unit 17 may also cause an operator to perform an imaging operation separately and then store the new image as the storage image.

Then, the control unit 15 sends the storage image to the management apparatus 2 via the communication unit 11 (Op. 27). The sending process may also be performed at other timing. For example, when an input of finishing a series of services from the operator, the communication unit 11 may also send all storage images stored during the series of services to the management apparatus 2. Together with the storage image, various types of information stored in the storage image table illustrated in FIG. 13 is also sent to the management apparatus 2.

Figure 16:
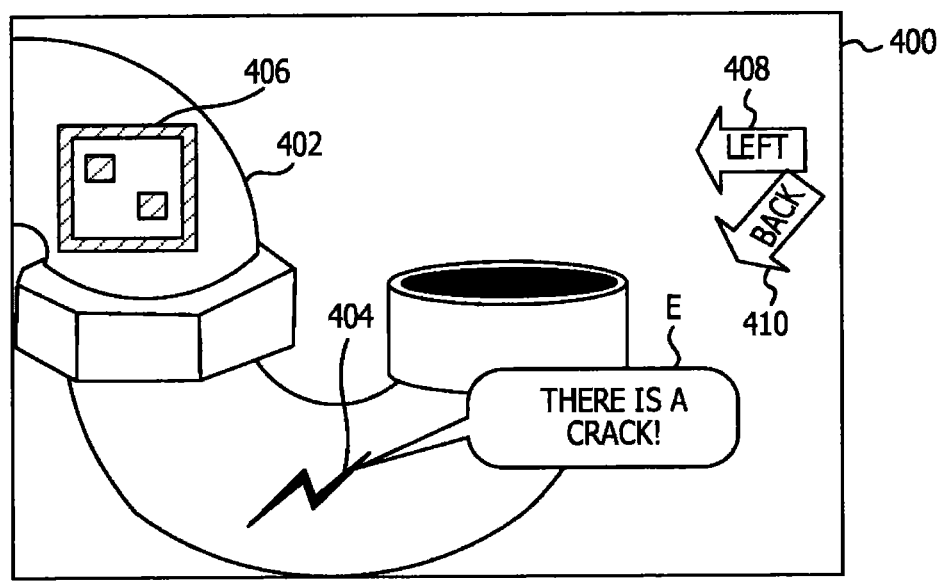
FIG. 16 is an example of a synthesized image including guide display.

FIG. 16 is an example of a synthesized image including guide display. A synthesized image 400 including guide display includes piping 402, a crack 404, a marker 406, the AR object E, guide display 408, and guide display 410. In the example of FIG. 16, guide display indicating movement to "left" and "back" is made to the operator.

FIG. 16 is an example of guide display when the difference between the imaging conditions to be the reference and the calculated imaging conditions is a positive value in the X value and a positive value in the Z value. According to the guide display, the user carries out movement to the left and the back until the information processing apparatus 1 decides that the imaging position to be the reference matches the actual imaging position, thereby allowing imaging of a storage image in a position matching the imaging position to be the reference.

As above, using the imaging position and the imaging direction relative to the reference object in the AR technique, it is possible that the information processing apparatus 1 in the present embodiment estimates the imaging position and the imaging direction regarding a plurality of images in which the observation object is imaged where the positional relationship with the reference object is unchanged. Then, by performing guidance indicating the difference between the reference and the current status of the imaging position and the imaging direction, it is possible that the information processing apparatus 1 causes the operator to take a plurality of images in which the observation object is taken in approximately identical imaging conditions. Eventually, it is possible that the management apparatus 2 gathers a storage image taken in approximately identical imaging conditions from the information processing apparatus 1. Accordingly, it is possible to easily compare the change with time in an observation object even by human eyes.

[Second Embodiment]

In the first embodiment, descriptions are given to the information processing apparatus 1 that estimates the imaging conditions in the marker coordinate system from a picture of a marker to perform guidance. In the second embodiment, descriptions are given to an information processing apparatus 3 that estimates the imaging conditions from a region of a picture of a reference object in the image to perform guidance.

In the second embodiment, similar to the first embodiment, it is a premise that the positional relationship between the reference object and the observation object is unchanged and the reference object and the observation object are taken in one image. In the second embodiment, when a first image and a second image are taken in identical imaging conditions, attention is given to that a picture of a reference object in the first image and a picture of a reference object in the second image become in a same size and in a same shape.

The information processing apparatus 3 extracts a region of a reference object from an image to be the reference to utilize information of the extracted region as the imaging condition. The image to be the reference includes the reference object and the observation object. Then, when the observation object is newly imaged, guide display indicating the region of the reference object in the image to be the reference is displayed. For example, the guide display is a frame to fit the reference object. The operator moves to a position where the reference object fits in the frame to image the observation object.

Figure 17A:
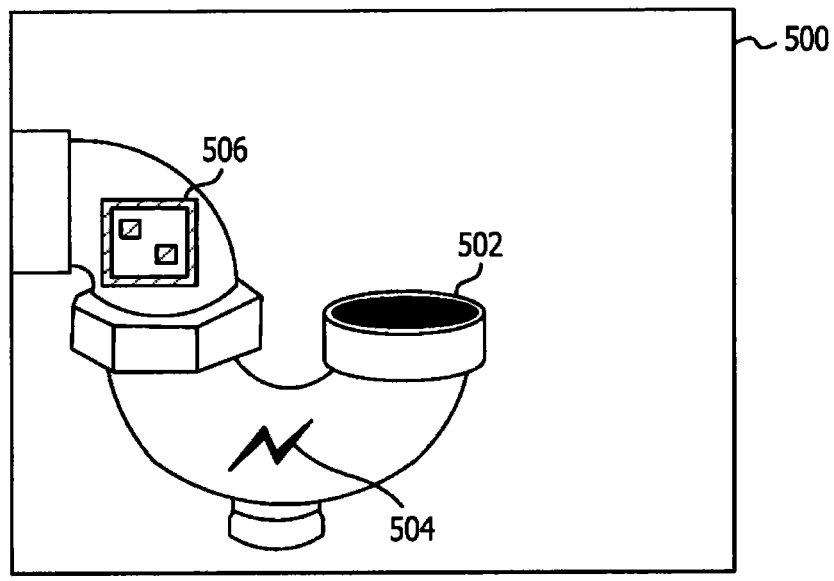
FIGS. 17A and 17B illustrate guide display according to a second embodiment.
Figure 17B:
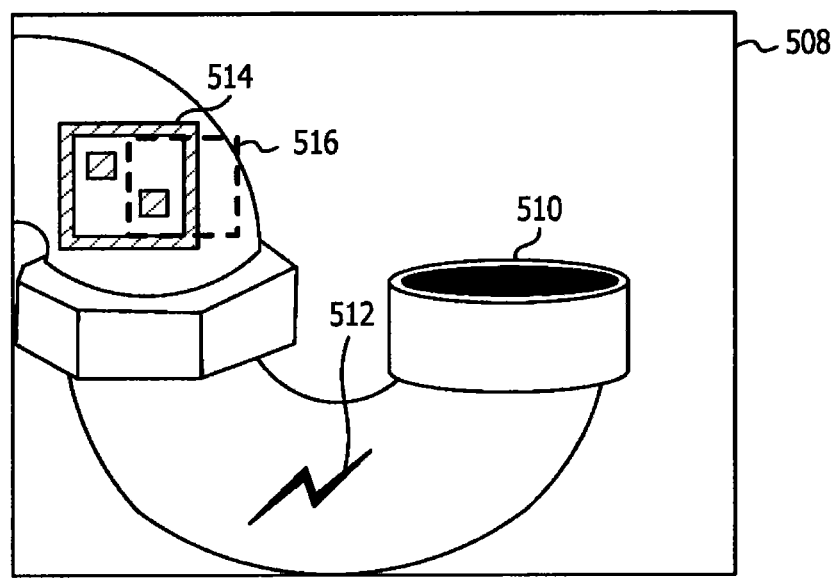

FIGS. 17A and 17B illustrate guide display according to the second embodiment. FIG. 17A illustrates an image 500 to be the reference. The information processing apparatus 3 generates the imaging conditions using a region of a picture of a marker 506 (reference object) in the image 500. The image 500 also includes a crack 504 and piping 502, which are observation objects.

The information processing apparatus 3 utilizes a region of the picture of the marker 506 recognized from the image 500 as the imaging conditions of the crack 504. As described before, the region of the picture of the marker 506 is information allowing estimation of the imaging position and the imaging direction of the crack 504.

FIG. 17B illustrates a synthesized image 508 including guide display 516. The synthesized image 508 includes a picture of a marker 514 at the time of imaging, piping 510, and a crack 512. The guide display 516 indicates a region of a picture of the marker 506 in the image 500 to be the reference. The operator moves to fit the marker 514 to the guide display 516 referring to the guide display 516, thereby allowing taking of an image in imaging conditions similar to the image 500.

Figure 18:
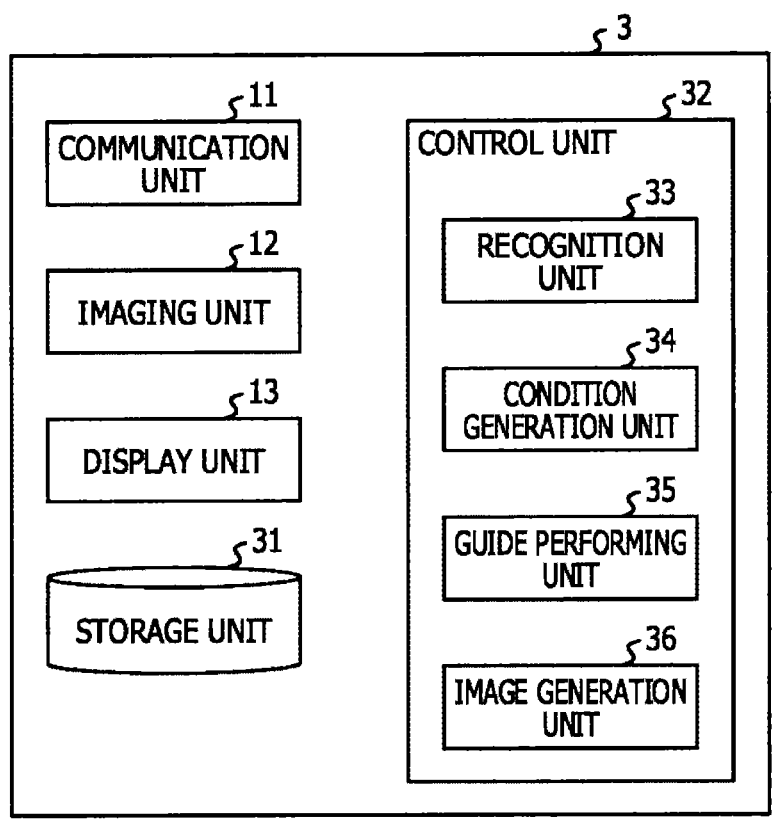
FIG. 18 is a functional block diagram of an information processing apparatus according to the second embodiment.

The system according to the second embodiment includes the information processing apparatus 3 and the management apparatus 2. Next, functional configuration of the information processing apparatus 3 according to the second embodiment is described. FIG. 18 is a functional block diagram of an information processing apparatus according to the second embodiment. Regarding processing units that carry out process similar to the information processing apparatus 1 according to the first embodiment, an identical reference numeral is given thereto and also descriptions are omitted.

The information processing apparatus 3 includes a communication unit 11, an imaging unit 12, a display unit 13, a storage unit 31, and a control unit 32. Further, the control unit 32 includes a recognition unit 33, a condition generation unit 34, a guide performing unit 35, and an image generation unit 36.

In a method similar to the recognition unit 16, the recognition unit 33 recognizes a reference object from an input image and also obtains identification information to identify the reference object. Further, the recognition unit 33 generates a transformation matrix M similar to the recognition unit 16. In addition, the recognition unit 33 generates region information of the reference object in the input image. For example, as the region information, a position of a pixel equivalent to a feature point of the reference object is obtained.

The condition generation unit 34 generates imaging conditions of the image to be the reference. For example, when addition of a new observation object is commanded by an operator, the condition generation unit 34 obtains the region information in the image to be the reference from the recognition unit 33. Then, the condition generation unit 34 generates imaging condition information by associating the region information with the marker ID. The imaging condition information thus generated is sent to the management apparatus 2 via the communication unit 11.

Next, similar to the guide performing unit 17, the guide performing unit 35 generates guide information that allows understanding of a difference between a first imaging position estimated based on a picture of the reference object in the input image and a second imaging position specified in advance. It is to be noted that the guide performing unit 35 generates guide information to display region information of the reference object in the image to be the reference.

The image generation unit 36 generates a synthesized image similar to the image generation unit 18. The image generation unit 36 draws a frame to fit a reference object on the input image based on the guide information.

Similar to the first embodiment, the storage unit 31 has a template information table, a content information table, an imaging condition information table, and a storage image table. It is to be noted that data configuration of the imaging condition information table is different from the first embodiment.

FIG. 19 illustrates an imaging condition information table in the second embodiment. In the second embodiment, as the imaging condition information, region information indicating a region of a marker, which is the reference object, is stored in association with the marker ID.

The region information is, for example, information indicating a position of a pixel equivalent to a plurality of feature points that configure the reference object. When a reference object in a square shape, such as the marker M, is employed, as illustrated in FIG. 19, pixels equivalent to four corners of the marker turns out to be the feature points. Then, the positions of the respective feature points are stored in the imaging condition information table as a first feature point position, a second feature point position, a third feature point position, and a fourth feature point position. Here, the coordinate value stored as the position of each feature point may be a value in any coordinate system. It is to be noted that, when coordinate values in the screen coordinate system are employed, it is possible to draw a frame for guide display without coordinate transformation.

In addition, in the storage unit 23 of the management apparatus 2 according to the second embodiment as well, an imaging condition information table having data configuration similar to FIG. 19 is held.

Figure 20:
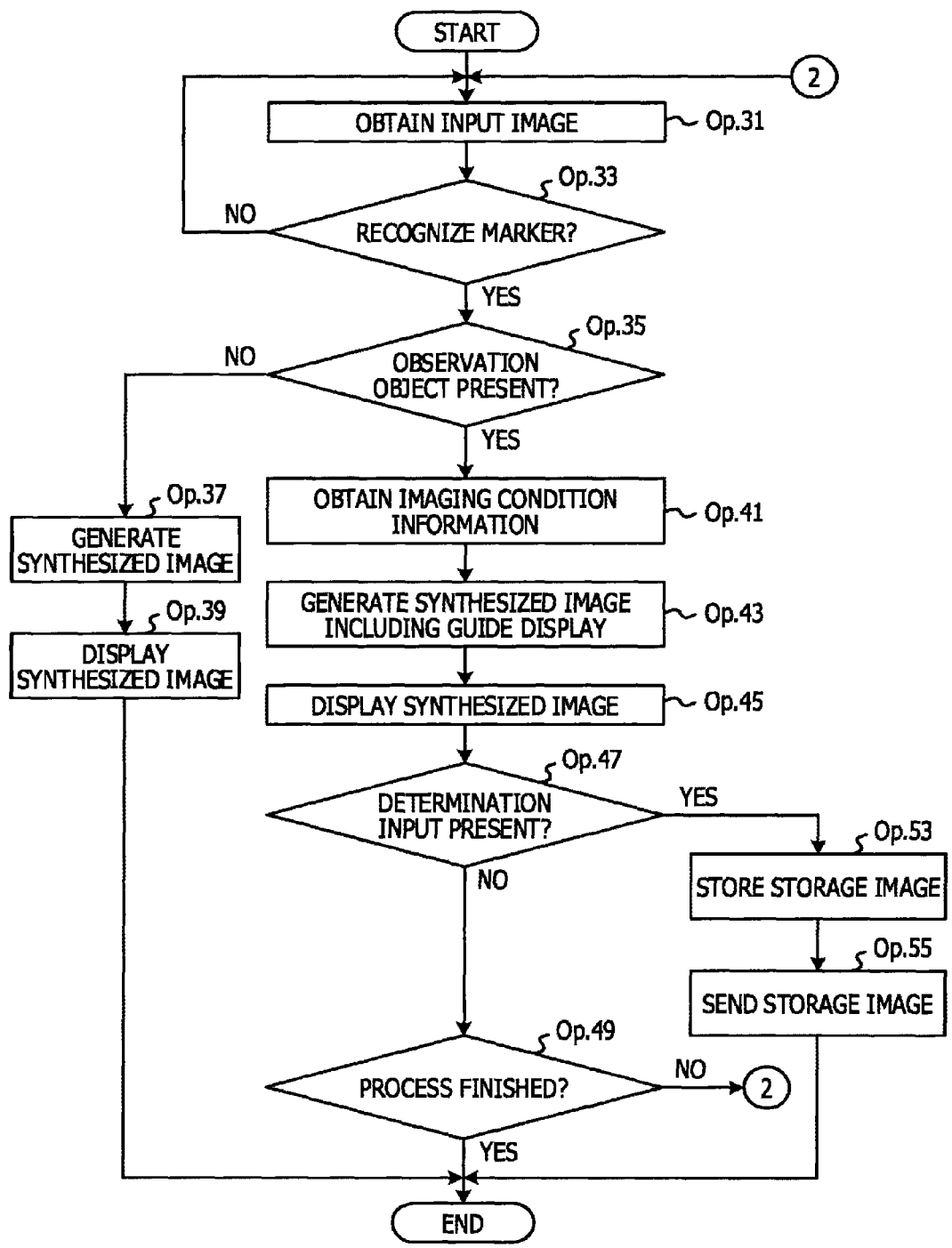
FIG. 20 illustrates a flowchart of guiding process according to the second embodiment.

Next, descriptions are given to a flow of various types of process regarding the second embodiment. FIG. 20 illustrates a flowchart of guiding process according to the second embodiment. The guide program is a program in which a procedure of guiding process performed by the control unit 32 is defined. The control unit 32 carries out preprocess prior to the main guiding process. The preprocess is process similar to the first embodiment.

The recognition unit 33 obtains an image stored in a buffer provided in the storage unit 31 (Op. 31). The image obtained here becomes the input image. The recognition unit 33 decides whether a marker is recognized from the input image (Op. 33). In addition, the recognition unit 33 reads the marker ID similar to Op. 3. Further, similar to Op. 3, the recognition unit 33 calculates the positional coordinates (Xc1, Yc1, Zc1) and the rotational coordinates (P1c, Q1c, R1c) to generate the transformation matrix M. In addition, the recognition unit 33 generates region information of a picture of the reference object in the input image.

When the marker is not recognized (no in Op. 33), the recognition unit 33 goes back to Op. 31. In contrast, when the marker is recognized (yes in Op. 33), the recognition unit 33 outputs the marker ID to the guide performing unit 35, and the guide performing unit 35 decides presence of an observation object (Op. 35).

When there is no observation object (no in Op. 35), the image generation unit 36 generates a synthesized image using the content information, the template information, and the transformation matrix M (Op. 37). Then, the display unit 13 displays the synthesized image (Op. 39). Then, the process is finished. Here, similar to the first embodiment, when there is no observation object, the guide performing unit 35 may also decide whether to perform addition of a new observation object.

In contrast, when there is an observation object (yes in Op. 35), the guide performing unit 35 obtains imaging condition information corresponding to the recognized marker ID from the storage unit 31 (Op. 41). As illustrated in FIG. 19, the imaging condition information is the region information of the reference object in the image to be the reference.

Next, the image generation unit 36 generates a synthesized image in which an AR content is projected on the input image using the content information, the template information, and the transformation matrix M, and also draws guide display based on the imaging condition information outputted from the guide performing unit 35 (Op. 43).

Then, the display unit 13 displays the synthesized image including the guide display (Op. 45). Next, the guide performing unit 35 decides whether or not a determination input to store an image is accepted from a user (Op. 47). When the reference object in a currently inputted image approximately matches the guide display, the user performs a determination input to make the input image to be a storage image. A button for determination input may also be provided on the synthesized image displayed in Op. 45.

When the determination input is not accepted (no in Op. 47), the control unit 32 decides whether or not to finish the process (Op. 49). For example, when an input of process finishing is carried out by the user (yes in Op. 49), finishing of the process is decided. When the process is finished, the series of guiding process is finished directly. In contrast, when the process is not finished (no in Op. 49), the process goes back to Op. 31.

When a determination input is accepted in Op. 47 (yes in Op. 47), the guide performing unit 35 stores the input image obtained in Op. 31 as a storage image (Op. 53). Then, the control unit 32 sends the storage image to the management apparatus 2 via the communication unit 11 (Op. 55). Then, the series of the process is finished.

Although the guide performing unit 35 decides presence of a determination input based on an input from the user in Op. 47, a storage image may also be stored similar to the first embodiment when region information of the reference object displayed as the guide display matches region information of the reference object in the input image.

Specifically, the guide performing unit 35 compares the region information of the reference object prescribed as the imaging conditions with the region information of the reference object in the input image. For the respective plurality of feature points of the marker M, the guide performing unit 35 decides whether the positions approximately match. For example, when approximate matching is decided for all four feature points, the guide performing unit 35 stores the input image as the storage image in the storage unit 31.

As above, the information processing apparatus 3 according to the second embodiment displays the region information of the reference object in the reference image as information indicating the imaging position and the imaging direction of the storage image. The operator adjusts the imaging position and the imaging direction based on the region information of the reference object in the reference image, thereby allowing the information processing apparatus 3 to store the image taken in imaging conditions similar to the reference image.

[First Modification]

As a first modification of the first embodiment and the second embodiment, a plurality of imaging condition information items may also be associated with one reference object. For example, there is a case that an observation object to be imaged together with a certain reference object is different in the inspection service and the maintenance and management services. Therefore, the first modification manages different imaging condition information for each service type. As information to identify the service type, a scenario ID is utilized.

Firstly, an operator inputs a scenario ID to identify a service content that is performed by him/herself in advance, thereby uniquely specifying the identification information (marker ID) of the reference object and the imaging condition information in accordance with the scenario ID. The management apparatus 2 may also be configured to obtain the scenario ID together with the marker ID when accepting imaging condition information request from the information processing apparatus 1 or 3, and may also be configured to accept specification of the scenario ID in advance.

Even in the inspection service, there is a case that an observation object to be imaged together with a certain reference object is different in an inspection service A and an inspection service B. In the first modification, even in an identical service type, the imaging condition information is further managed in accordance with specific contents of the activity. As the information to identify contents of an activity, a scene ID is utilized. After selecting the scenario ID, the operator further selects the scene ID, thereby uniquely specifying the imaging condition information corresponding to the service content and the contents of an activity.

As above, in the first modification, it is possible to set a plurality of imaging conditions relative to a certain reference object utilizing the scenario and the scene. Therefore, it is possible to set a plurality of imaging conditions to one reference object without installing a reference object for each scenario and scene and to reduce installation load of a reference object.

FIG. 21 illustrates an imaging condition information table in the first modification. The example of FIG. 21 illustrates when the first modification is applied to the imaging condition information table according to the first embodiment. The imaging condition information table stores a marker ID, a scenario ID, a scene ID, and imaging conditions in association. The imaging conditions are an imaging position and an imaging direction. The information processing apparatus 1 according to the first modification is capable of switching the imaging conditions for a marker ID "M1" in accordance with the scenario ID and the scene ID. The embodiment may also set only either one of the scenario ID and the scene ID.

[Second Modification]

The management apparatus 2 may also perform guiding process. The control unit 22 of the management apparatus 2 performs, for example, Op. 1, Op. 3, Op. 5, Op. 7, Op. 9, Op. 11, Op. 13, Op. 15, Op. 17, Op. 19, Op. 21, and Op. 25 illustrated in FIG. 15. In Op. 9 and Op. 19, a synthesized image is sent to the information processing apparatus 1 and displayed in the information processing apparatus 1. In Op. 1 and Op. 21, an input image is received from the information processing apparatus 1. Similarly, the guiding process according to the second embodiment may also be performed by the control unit 22 of the management apparatus 2.

In the second modification, the template information, the content information, and the imaging condition information may not be provided to the information processing apparatus 1. Since the information processing apparatus 1 or the information processing apparatus 3 only carries out imaging of an image and display of an image, so that the process load is reduced.

[Third Modification]

Further, the information processing apparatus 1 according to the first embodiment may also record the imaging position and the imaging direction relative to the marker as log information to generate a movement locus of a user. Specifically, the information processing apparatus 1 recognizes the reference object and also obtains the imaging position and the imaging direction relative to the reference object in a method similar to the first embodiment. Then, the information processing apparatus 1 records the identification information (marker ID) of the recognized reference object in association with the imaging position, the imaging direction, and the time and date of imaging as log information. Further, a user ID to identify a user may also be included in the log information.

The recording of log information is continued from recognition of the marker to finishing of the recognition, and as a new marker is recognized, recording of log information including the new marker ID starts. In such a manner, the information processing apparatus 1 is capable of gathering log information regarding user movement (imaging position relative to the marker) during the recognition of the marker.

Further, the information processing apparatus 1 according to the present modification may also generate a movement locus of a user based on the gathered log information. Specifically, map data in which positional information (information on an installation position in a facility) of each marker in the real space is associated with map information in the facility is prepared in advance. Then, the information processing apparatus plots a position (imaging position) of a user relative to each marker on the map, thereby mapping the change in position of the user on the map data as a movement locus.

The movement locus of the user is recorded as marker relative coordinates in the marker coordinate system. The map data is set in a global coordinate system to hold the marker position and direction in the global coordinates. The information processing apparatus coordinate transforms the marker relative coordinates of the movement locus of the user to the global coordinate system using the marker position on the map data as a reference, thereby plotting the movement locus on the map data.

Figure 22:
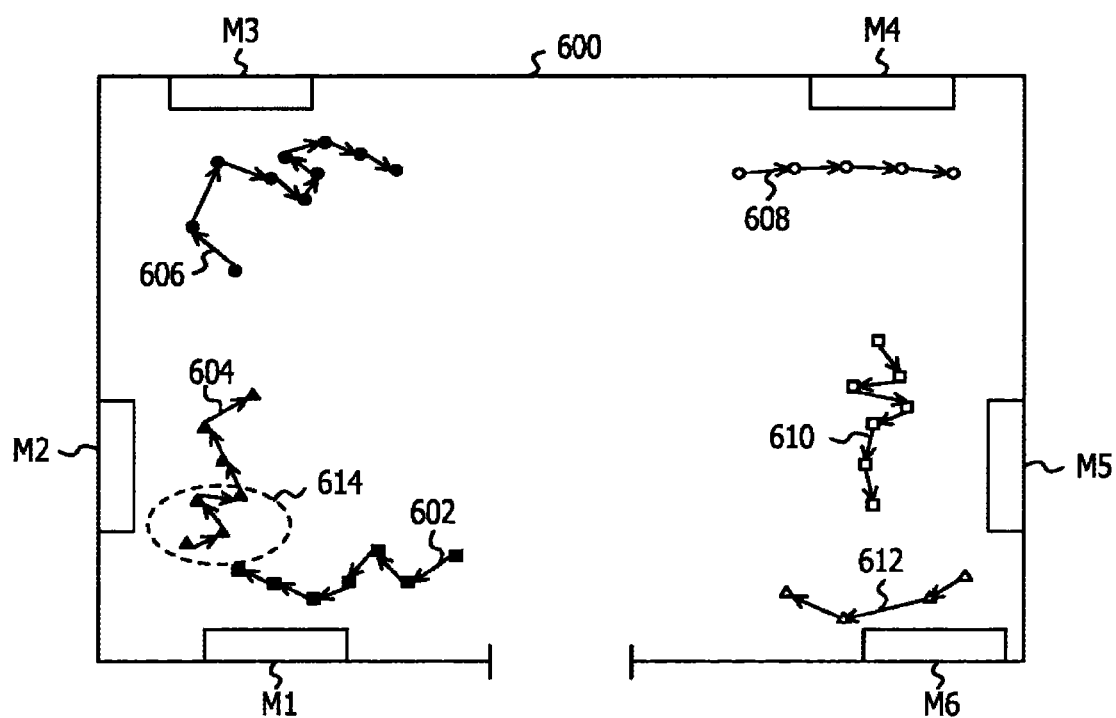
FIG. 22 is a schematic diagram of map data where movement loci of a user are mapped.

FIG. 22 is a schematic diagram of map data where movement loci of a user are mapped. FIG. 22 is an example of mapping movement loci 602, 604, 606, 608, 610, and 612 of a user on the map data including a workplace 600 and markers M1, M2, M3, M4, M5, and M6 installed in the workplace 600. By narrowing a placement interval of the markers is narrowed, a movement locus of a user may also be tracked without interruption.

The movement locus 602 is generated from log information including a marker ID of the marker M1. The movement locus 604 is generated from log information including a marker ID of the marker M2. The movement locus 606 is generated from log information including a marker ID of the marker M3. The movement locus 608 is generated from log information including a marker ID of the marker M4. The movement locus 610 is generated from log information including a marker ID of the marker M5. The movement locus 612 is generated from log information including a marker ID of the marker M6.

Specifically, the movement locus 602 has a plotted imaging position of the log information including the marker ID of the marker M1. Further, the respective plotted points are connected in the order of earlier time and date of imaging in the log information.

In such a manner, the log information generated during recognition of each marker is mapped on the map data, thereby allowing visual recognition of a staying location and a movement locus of a user. For example, in FIG. 22, it is understood that the user stays in the area indicated by 614. Further, in the map data, staying time and date of a user may also be displayed together.

[Another Application]

The technique disclosed in the embodiments is applicable other than to control the imaging condition to take an image subject to observation. Here, descriptions are given to another application.

Even when a marker is recognized in a taken image, there is a case that an AR object is not superposition displayed on the taken image. This is a case where the placement position of the AR object is out of the area capable of superposition display on the taken image. Specifically, when the operator is in a state close to a marker, an AR content set in distance from the marker is not included in the synthesized image. Therefore, it is not possible for the user to understand the AR content.

In order to avoid such a situation, the above embodiments are applied. That is, appropriate imaging conditions are guided to the user. Specifically, an administrator sets in imaging conditions according to the imaging position and the imaging direction in advance. Then, guide display is performed in an embodiment capable of understanding a difference between the imaging conditions supposed from the taken image taken by the operator and the imaging conditions set in advance. The operator carries out movement in accordance with the guide display, thereby allowing avoidance of the situation where the AR object associated with the reference object is not displayed due to the influence of the imaging conditions.

[Hardware Configuration Example]

Figure 23:
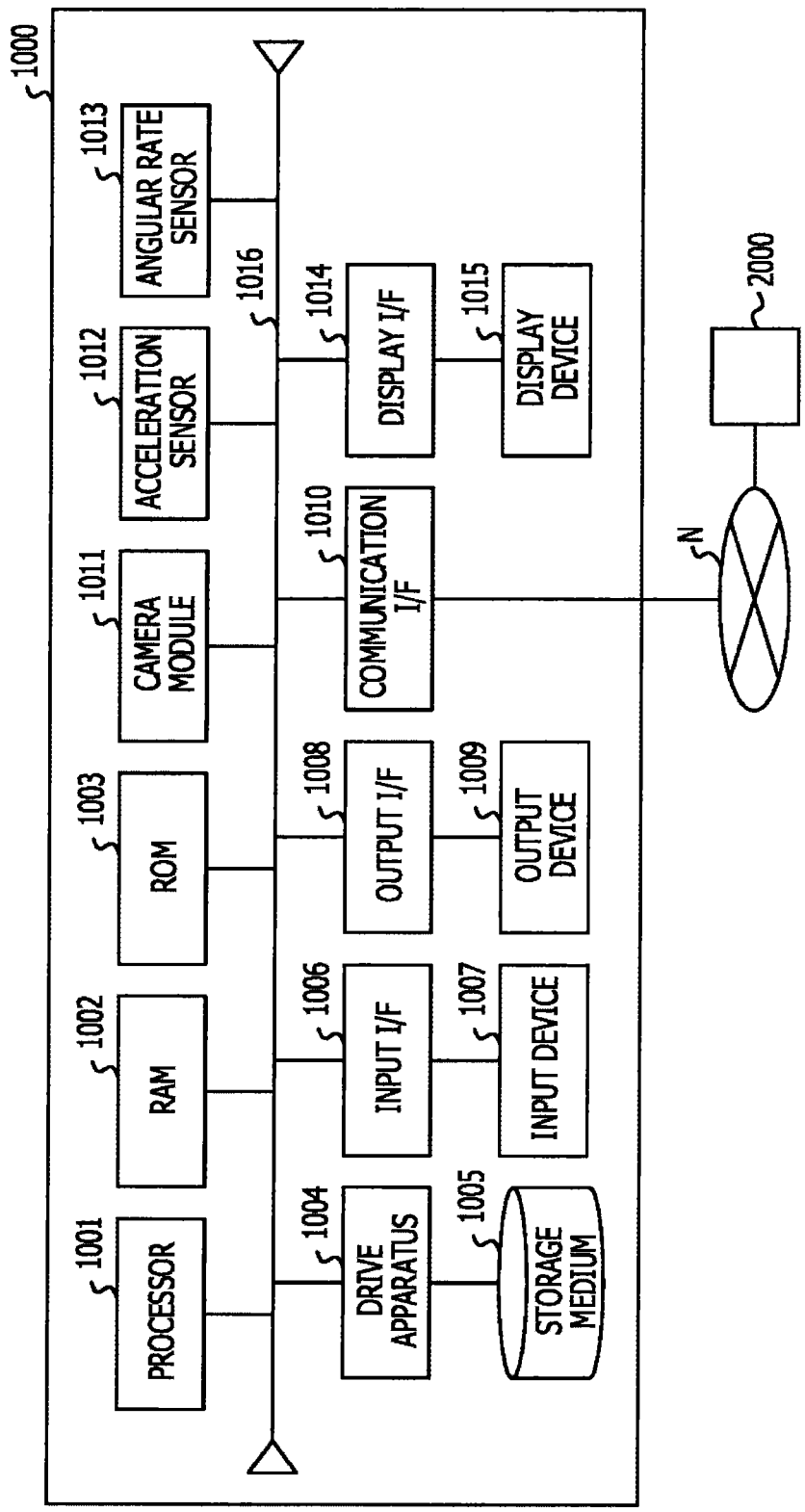
FIG. 23 is a hardware configuration example of the information processing apparatus in each embodiment.

Descriptions are given to hardware configuration of the information processing apparatus 1 and the management apparatus 2 illustrated in each embodiment. FIG. 23 is a hardware configuration example of an information processing apparatus in each embodiment. The information processing apparatus 1 and the information processing apparatus 3 are achieved by a computer 1000. That is, the functional blocks illustrated in FIG. 9 and FIG. 18 are achieved by, for example, the hardware configuration illustrated in FIG. 23.

The computer 1000 includes, for example, a processor 1001, a random access memory (RAM) 1002, a read only memory (ROM) 1003, a drive apparatus 1004, a storage medium 1005, an input interface (input I/F) 1006, an input device 1007, an output interface (output I/F) 1008, an output device 1009, a communication interface (communication I/F) 1010, a camera module 1011, an acceleration sensor 1012, an angular rate sensor 1013, a display interface (display I/F) 1014, a display device 1015, bus 1016, and the like. The respective hardware is connected via the bus 1016.

The communication interface 1010 carries out control of communication via the network N. The communication controlled by the communication interface 1010 may also be in an embodiment of accessing the network N via a wireless base station utilizing wireless communication. One example of the communication interface 1010 is a network interface card (NIC). The input interface 1006 is connected to the input device 1007 and transmits an input signal received from the input device 1007 to the processor 1001. The output interface 1008 is connected to the output device 1009 and causes the output device 1009 to perform an output in accordance with an instruction of the processor 1001. One example of the input interface 1006 and the output interface 1008 is an I/O controller.

The input device 1007 is an apparatus that sends an input signal in accordance with an operation. The input signal is, for example, a key apparatus, such as a keyboard and a button mounted in a main body of the computer 1000, and a pointing device, such as a mouse and a touch panel. The output device 1009 is an apparatus that outputs information in accordance with control of the processor 1001. The output device 1009 is, for example, a sound output apparatus, such as a speaker.

The display interface 1014 is connected to the display device 1015. The display interface 1014 displays image information written by the processor 1001 in the buffer for display provided in the display interface 1014 on the display device 1015. One example of the display interface 1014 is a graphic card and a graphic chip. The display device 1015 is an apparatus that outputs information in accordance with control of the processor 1001. For the display device 1015, an image output apparatus, such as a display, a transmissive display, and the like are used.

When a transmissive display is used, the projection image of the AR content is not synthesized with the taken image but, for example, may also be controlled to be displayed in an appropriate position in the transmissive display. Thus, a user obtains vision in a state of matching the real space and the AR content. In addition, for example, an input/output apparatus, such as a touch screen, is used as the input device 1007 and the display device 1015. In addition, instead of building the input device 1007 and the display device 1015 inside the computer 1000, the input device 1007 and the display device 1015, for example, may also be connected to the computer 1000 from outside.

The RAM 1002 is a readable and writable memory apparatus, and for example, a semiconductor memory, such as a static RAM (SRAM) and a dynamic RAM (DRAM), a flash memory other than a RAM, or the like may also be used. The ROM 1003 includes a programmable ROM (PROM).

The drive apparatus 1004 is an apparatus that carries out at least either one of reading and writing of information stored in the storage medium 1005. The storage medium 1005 stores the information written by the drive apparatus 1004. The storage medium 1005 is, for example, at least one of the storage medium of the type, such as a hard disk, a solid state drive (SSD), a compact disk (CD), a digital versatile disk (DVD), and a blue-ray disk. In addition, for example, the computer 1000 includes the drive apparatus 1004 compatible with the type of the storage medium 1005 in the computer 1000.

The camera module 1011 includes an imaging device (image sensor) and the imaging device writes data obtained by photoelectric conversion in an image buffer for input image included in the camera module 1011. The acceleration sensor 1012 measures the acceleration that applies to the acceleration sensor 1012. The angular rate sensor 1013 measures the angular rate of a behavior by the angular rate sensor 1013.

The processor 1001 reads a program stored in the ROM 1003 or the storage medium 1005 to the RAM 1002 and carries out process in accordance with a procedure of the read program. For example, the functions of the control unit 15 are achieved by the processor 1001 carrying out control of other hardware based on the guide program according to the first embodiment. For example, the functions of the control unit 32 are achieved by the processor 1001 carrying out control of other hardware based on a guide program according to the second embodiment.

The functions of the communication unit 11 are achieved by the processor 1001 performing data communication by control of the communication interface 1010 and storing the received data in the storage medium 1005.

The functions of the storage unit 14 and the storage unit 31 are achieved by the ROM 1003 and the storage medium 1005 storing a program file and a data file and the RAM 1002 being used as a work area for the processor 1001. For example, the content information, the template information, the imaging condition information, and the like are stored in the RAM 1002.

The functions of the imaging unit 12 are achieved by the camera module 1011 writing image data in the image buffer for input image and the processor 1001 reading the image data in the image buffer for input image. The image data is, in a monitoring mode, for example, written in the image buffer for input image and also written in the buffer for display of the display device 1015 in parallel.

In addition, the functions of the display unit 13 are achieved by the image data generated by the processor 1001 being written in the buffer for display provided with the display interface 1014 and the display device 1015 carrying out display of the image data in the buffer for display.

Figure 24:
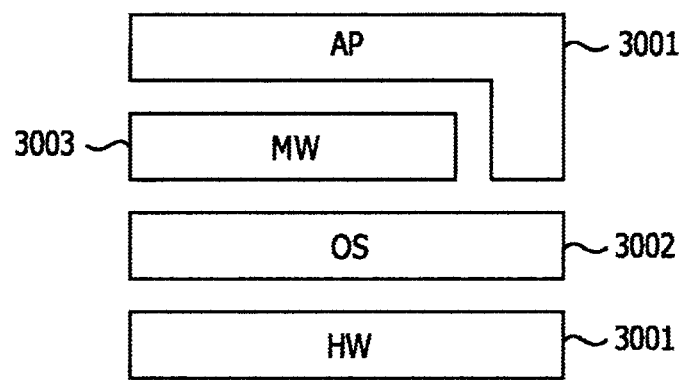
FIG. 24 illustrates a configuration example of a program that runs in a computer 1000.

Next, FIG. 24 illustrates a configuration example of a program that runs in the computer 1000. In the computer 1000, an operating system (OS) 3002 that controls a group of hardware runs. The processor 1001 runs in the procedure in accordance with the OS 3002 to carry out control and management of hardware (HW) 3001, thereby performing process by an application program (AP) 3004 and a middleware (MW) 3003 on the HW 3001.

In the computer 1000, a program, such as the OS 3002, the MW 3003, and the AP 3004, is, for example, read by the RAM 1002 and performed by the processor 1001. In addition, the guide program described in each embodiment is, for example, a program that is called from the AP 3004 as the MW 3003.

Alternatively, an AR control program including the guide program, for example, is a program to achieve the AR function as the AP 3004. The AR control program is stored in the storage medium 1005. The storage medium 1005 may be distributed in a state of being independent as the guide program according to the present embodiments or storing the AR control program including the guide program, separate from the computer 1000 main body.

Figure 25:
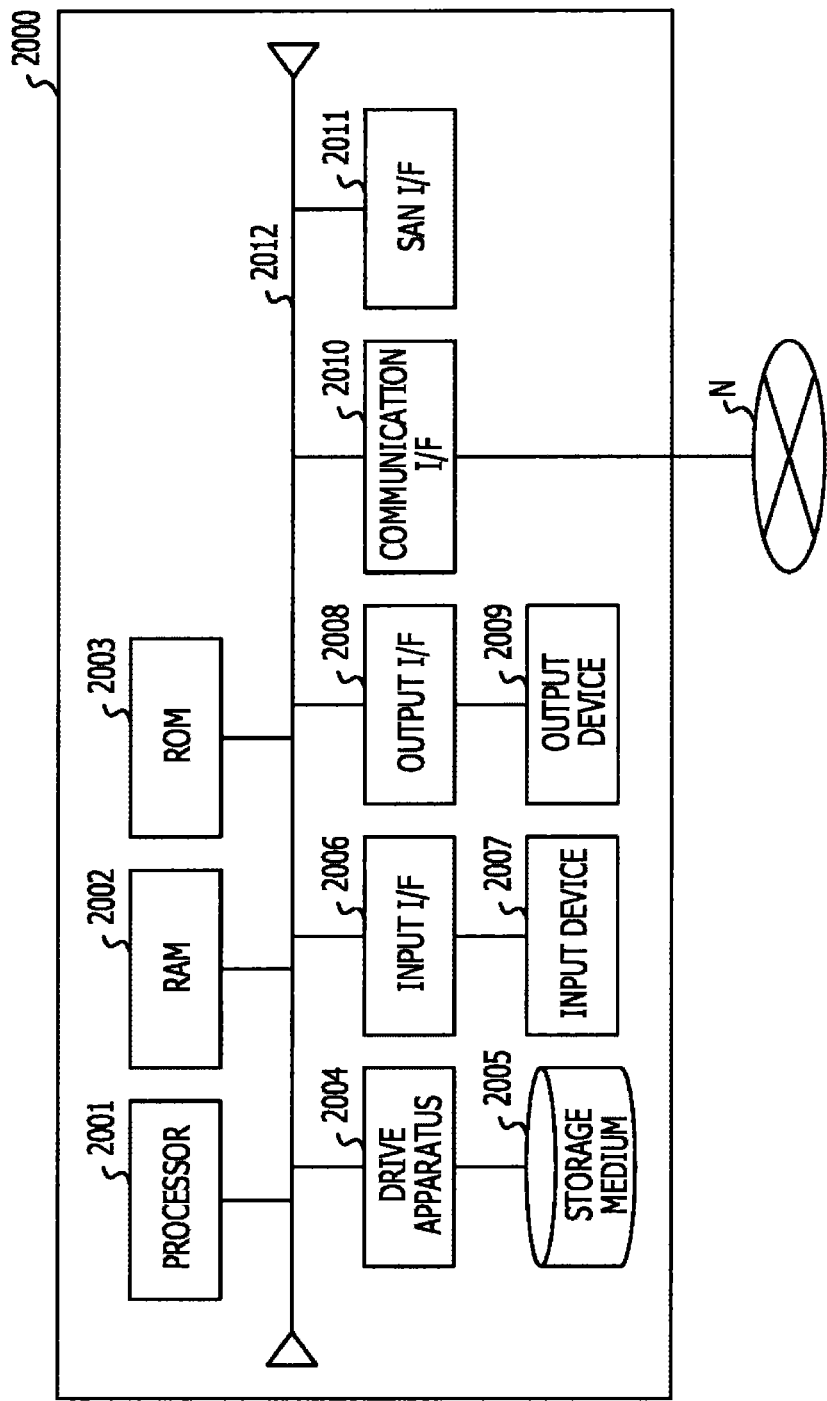
FIG. 25 is a hardware configuration example of a management apparatus.

Next, descriptions are given to hardware configuration of the management apparatus 2 in each embodiment. FIG. 25 is a hardware configuration example of a management apparatus. The management apparatus 2 is achieved by a computer 2000. The management apparatus 2 is achieved by, for example, the hardware configuration illustrated in FIG. 25. The computer 2000 includes, for example, a processor 2001, a RAM 2002, a ROM 2003, a drive apparatus 2004, a storage medium 2005, an input interface (input I/F) 2006, an input device 2007, an output interface (output I/F) 2008, an output device 2009, a communication interface (communication I/F) 2010, a storage area network (SAN) interface (SAN I/F) 2011, a bus 2012, and the like. The respective hardware is connected via the bus 2012.

For example, the processor 2001 is hardware similar to the processor 1001. The RAM 2002 is, for example, hardware similar to the RAM 1002. The ROM 2003 is, for example, hardware similar to the ROM 1003. The drive apparatus 2004 is, for example, hardware similar to the drive apparatus 1004. The storage medium 2005 is, for example, hardware similar to the storage medium 1005. The input interface (input I/F) 2006 is, for example, hardware similar to the input interface 1006. The input device 2007 is, for example, hardware similar to the input device 1007.

The output interface (output I/F) 2008 is, for example, hardware similar to the output interface 1008. The output device 2009 is, for example, hardware similar to the output device 1009. The communication interface (communication I/F) 2010 is, for example, hardware similar to the communication interface 1010. The storage area network (SAN) interface (SAN I/F) 2011 is an interface to connect the computer 2000 to the SAN and includes a host bus adapter (HBA).

The processor 2001 reads a program stored in the ROM 2003 and the storage medium 2005 and carries out process in accordance with the procedure of the read program. At that time, the RAM 2002 is used as a work area for the processor 2001. The program includes a program according to various types of process in the management apparatus 2. For example, the program is a program in which process selecting the template information, the content information, the imaging condition information to be provided to the computer 1000 and the like are described.

The management apparatus 2 stores various types of information by the ROM 2003 and the storage medium 2005 storing a program file and a data file or the RAM 2002 being used as a work area for the processor 2001. The processor 2001 carries out communication process by controlling the communication interface 2010.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A guiding method comprising:
  obtaining data of a first image;
  detecting, with a computer, reference image data corresponding to a reference object in the data of the first image;
  calculating, with the computer, a first condition based on an appearance of the reference object in the first image, the first condition indicating an operational condition of an imaging apparatus when the first image was captured; and
  for a second image to be captured, outputting guide information that indicates how to adjust the first condition to match a reference condition, the reference condition corresponds to an appearance of the reference object in a reference image captured under the reference condition, wherein
  the first condition and the reference condition include positional information with the reference object and angle information with respect to the reference object; and
  the guide information indicates a first difference between positional information of the first condition and another positional information of the reference condition, and a second difference between angle information of the first condition and another angle information of the reference condition.

2. The guiding method according to claim 1, further comprising:
  storing data of the second image into a memory in associated with time information.

3. The guiding method according to claim 1, further comprising:
  storing data of the second image into a memory in associated with identification information of the reference object.

4. The guiding method according to claim 1, further comprising:
  after the outputting, acquiring data of the second image;
  determining whether a second condition associated with the second image matches the reference condition; and
  storing the data of the second image into a memory when the second condition of the second image is determined to match the reference condition.

5. The guiding method according to claim 1, further comprising:
  after the outputting, acquiring an instruction that includes a user-determined second condition of the second image that matches the reference condition; and
  storing data of the second image into a memory.

6. The guiding method according to claim 5, wherein the instruction is user-specified and provided by another computer.

7. The guiding method according to claim 1, wherein the guide information includes direction information to adjust the first condition to match the reference condition.

8. The guiding method according to claim 1, wherein the outputting includes displaying the guide information as a guide image of the reference object captured in the reference image.

9. A guiding method comprising:
  obtaining a first image at a first operational condition of an imaging device;

comparing, with a computer an appearance of a reference object in the first image to an appearance of the reference object in a reference image captured under a reference condition; and for a subsequent image to be captured, outputting guide information that indicates how to adjust the first operational condition to replicate the reference condition, wherein the first operational condition and the reference condition include positional information with the reference object and angle information with respect to the reference object; and the guide information indicates a first difference between positional information of the first operational condition and another positional information of the reference condition, and a second difference between angle information of the first operational condition and another angle information of the reference condition.

10. A non-transitory computer readable storage medium storing a downloaded application, the downloaded application having a method executed by a processor, the method comprising:

obtaining data of a first image;

detecting reference image data corresponding to a reference object in the data of the first image;

calculating a first condition based on an appearance of the reference object in the first image, the first condition indicating an operational condition of an imaging apparatus when the first image was captured; and for a second image to be captured, outputting guide information that indicates how to adjust the first condition to match a reference condition, the reference condition corresponds to an appearance of the reference object in a reference image captured under the reference condition, wherein the first condition and the reference condition include positional information with the reference object and angle information with respect to the reference object; and the guide information indicates a first difference between positional information of the first condition and another positional information of the reference condition, and a second difference between angle information of the first condition and another angle information of the reference condition.

11. An information processing apparatus comprising:

circuitry configured to:

obtain data of a first image, detect reference image data corresponding to a reference object in the data of the first image, calculate a first condition based on an appearance of the reference object in the first image, the first condition indicating an operational condition of an imaging apparatus when the first image was captured, and for a second image to be captured, output guide information that indicates how to adjust the first condition to match a reference condition, the reference condition corresponds to an appearance of the reference object in a reference image captured under the reference condition, wherein the first condition and the reference condition include positional information with the reference object and angle information with respect to the reference object; and the guide information indicates a first difference between positional information of the first condition and another positional information of the reference condition, and a second difference between angle information of the first condition and another angle information of the reference condition.

* * * * *